(12) United States Patent
Austin et al.

(10) Patent No.: US 11,235,640 B1
(45) Date of Patent: Feb. 1, 2022

(54) SYSTEM AND METHOD OF GREEN TEMPERATURE OPTIMIZATION IN A VEHICLE

(71) Applicant: Toyota Motor Engineering & Manufacturing North America, Inc., Plano, TX (US)

(72) Inventors: Benjamin P. Austin, Saline, MI (US); Joshua E. Domeyer, Madison, WI (US); John K. Lenneman, Okemos, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/938,415

(22) Filed: Jul. 24, 2020

(51) Int. Cl.
*B60H 1/00* (2006.01)

(52) U.S. Cl.
CPC ....... *B60H 1/00985* (2013.01); *B60H 1/0073* (2019.05); *B60H 1/00807* (2013.01)

(58) Field of Classification Search
CPC .............. B60H 1/00985; B60H 1/0073; B60H 1/00807
See application file for complete search history.

(56) References Cited

U.S. PATENT DOCUMENTS

| | | | |
|---|---|---|---|
| 9,830,820 B2 | 11/2017 | Semsey et al. | |
| 2009/0277199 A1* | 11/2009 | Manas | F25D 29/00 62/129 |
| 2013/0289927 A1* | 10/2013 | Smith | G06Q 10/0832 702/130 |
| 2016/0238397 A1 | 8/2016 | Caira et al. | |
| 2017/0148294 A1 | 5/2017 | Eswaran | |
| 2017/0255901 A1 | 9/2017 | Rodriguez et al. | |
| 2017/0349079 A1* | 12/2017 | Wilkinson | B60P 3/205 |
| 2019/0272753 A1 | 9/2019 | Homutescu | |

FOREIGN PATENT DOCUMENTS

| | | |
|---|---|---|
| DE | 10 2015 200 492 A1 | 7/2016 |
| JP | 2007-316000 A | 12/2007 |
| JP | 2008-275491 A | 11/2008 |
| JP | 2011-122938 A | 6/2011 |
| JP | 4958107 B2 | 6/2012 |
| JP | 2013-246120 A | 12/2013 |
| KR | 10-0980660 B | 9/2010 |

* cited by examiner

*Primary Examiner* — Schyler S Sanks
(74) *Attorney, Agent, or Firm* — Oblon, McClelland, Maier & Neustadt, L.L.P.

(57) ABSTRACT

A system and method of temperature optimization in a passenger vehicle when transporting perishable items, includes a passenger vehicle having predetermined storage compartments, an in-vehicle computer network connected to a plurality of sensors; and a display device in communication with the in-vehicle computer network. The display device obtains information about perishable items. The display device is configured to estimate time that the perishable items may be maintained in the vehicle. The conditions for perishable items may be optimized by determining parking locations and movement of the vehicle between parking locations in order to minimize temperature fluctuations in the vehicle. The display device is configured to update the user on the status of the perishable items and changed parking locations.

13 Claims, 19 Drawing Sheets

SYSTEM AND METHOD OF GREEN TEMPERATURE OPTIMIZATION IN A VEHICLE

BACKGROUND

Technical Field

The present disclosure is directed to a temperature optimization system to optimize conditions for perishable items placed in a vehicle, and in particular to determine driving time, parking locations, and to cause movement between parking locations in order to minimize temperature fluctuations in the vehicle.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Vehicles are being provided with increasingly sophisticated automated features for purposes of safety. Also referred to as driver assist technologies, these automated features include features for keeping a car within its lane, control of speed, and breaking. Automated features are facilitated by various types of vehicle sensors including exterior sensors that provide information used for the driver assist systems. Depending on the types of exterior sensors that a vehicle is equipped with, driver assist systems can include blind side monitoring, car following, object/person detection, to name a few.

Some automated features are being developed as part of a program to build autonomous vehicles, or self-driving cars. Several lowest to highest levels of automation have been defined. Each of the levels rely on a determination of the location of the vehicle. The levels of autonomous vehicles may use various external vehicle sensors (e.g., cameras, LiDAR, radar, ultrasonic, GPS, etc.) to scan the external environment. A lowest level of automation includes issuing warnings and performing some safety controls, such as breaking when following too closely to another vehicle. A next level includes a greater degree of shared control between the driver the vehicle, such as where the driver controls steering, but the vehicle has control over engine power and braking to maintain and vary speed. A level of automation includes a condition where the vehicle is under full control but the driver monitors the driving and can intervene at any time. Higher levels of automation are being pursued in which the driver may turn their attention to other tasks while the vehicle is performing driving control. A highest level of automation, via a fully autonomous vehicle, is contemplated in which no human intervention is required to drive the vehicle. The vehicle is expected to work on all roads in all weather conditions.

Work is being done to improve control of interior features. Interior sensors may be provided to monitor and control cabin environment, or monitor a driver for alertness and focus direction. Interior sensors may include video cameras, thermometers, heart rate monitors, to name a few.

Even control of features of the engine compartment are being improved. Sensors may be incorporated in the engine compartment to monitor the condition or state of the engine, cooling system, breaks, and tire pressure. The engine compartment sensors provide sensor information for controlling parameters such as fuel economy, conditions requiring maintenance, or operation of the engine, cooling system, or breaking.

However, most of the external and internal sensors and controls cease to operate when a vehicle is turned off. Only minimal features may be provided, typically in a standby or sleep mode. For example, vehicle doors and trunk may be remotely unlocked by way of an infrared signal or short range radio such as Bluetooth. Some vehicles include a remote start function that may be performed through the Internet. Theft protection systems may operate while the vehicle is turned off. Otherwise the environmental conditions in the interior cabin of the vehicle are subject to the environmental conditions of the exterior of the vehicle, such as heat and cold. In most cases the interior cabin of the vehicle can heat up to temperatures that are higher than the temperature of the environment surrounding the vehicle, due to factors such as direct sunlight, or high temperature weather conditions.

Studies have been performed to determine when and by how much the temperature of the interior cabin of a passenger vehicle reaches unsafe conditions while parked in direct sunlight, or even shade when the air is hot. In this disclosure, a passenger vehicle is any vehicle that is driven by a driver or is used by a vehicle user for transportation of the vehicle user. The passenger vehicle is not limited to a type of vehicle, e.g., sedan, sport utility vehicle, but may include a delivery vehicle or truck. The studies show that large passenger vehicles like vans take longer to heat up while subcompact vehicles take much less time to heat up. In any case, the studies show that despite the type of vehicle, on average a passenger vehicle can reach dangerous temperatures after an hour in direct sunlight, for example, a vehicle may reach about 115 degrees Fahrenheit. In the same conditions, but in shade, the vehicle interior can reach dangerous temperatures after about two hours. Also, specific areas in the vehicle become hotter than other areas. Areas such as seats and dashboard that receive direct sunlight can get even hotter. For example, the temperature of the seats can reach above 120 degrees Fahrenheit. Even in shade, seats can reach about 105 degrees Fahrenheit.

Subsequently, environmental factors such as the temperature and humidity of the interior cabin of the passenger vehicle can vary greatly between when the vehicle is being operated and when the vehicle is parked and turned off, as well as the location within the vehicle. Although much has been studied about heat in a parked car and its effects on people, especially young children, very little is known about how long perishable foods or frozen foods may be affected while being left in a passenger vehicle for extended periods of time.

As an example, suppose a driver takes a trip to a grocery store on a hot day, for example, mid 80 degrees Fahrenheit, purchases a variety of food items intended to last a week, including fresh produce, frozen foods, and fresh baked goods. At the time of purchase, the food items have been stored in ideal conditions, and most items are subject to expiration dates. The person that purchased the items typically has an expectation that the various food items would be in substantially the same condition when they unpack and store the food items at a destination, such as a home or apartment. However, it is not unusual for the person to make a stop at another location, such as another shop, or even make several stops on a trip to a destination, such as a home, apartment, or other destination location. During the trip, the temperature in the vehicle cabin may vary between hot and mild or between cold and mild over a course of an hour or longer. The person driving the vehicle will likely be unaware of the condition of the food items in the vehicle during the trip, but may continue to assume that the food items would still be in about the same condition as when they were purchased.

On the other hand, it may actually be the case that the condition of food items are greatly affected by the variations of temperature in the interior cabin during a trip. For example, frozen foods may begin to defrost and fresh produce may need to be eaten sooner than expected. In another case, a person may wish to accomplish several tasks during a return trip, rather than having to return home as soon as possible. In the latter case, the return trip may be extended to more than one hour, or even two or three hours. In still another case, the person may visit a store or market that is relatively distant from their home or apartment, for example, more than an hour drive. On hot days, a trip of several hours would be impractical especially for frozen food items, or fresh items like fish, meets or dairy products.

It is one object of the present disclosure to describe a system and method determining the optimal conditions for a vehicle to minimize temperature fluctuations inside the vehicle especially when a vehicle contains perishable items. The system may obtain information about the perishable items, use GPS and home location to estimate distance and route of the vehicle back to the home, and when the vehicle deviates from a route to a destination and enters a parking lot, the system determines the optimum location in the parking lot. The system may determine an optimal parking location based on certain conditions preset by the driver of the vehicle or vehicle user, including a desired temperature range, amount of exposure to sunlight, and/or proximity to a store or other business that is a reason for the deviation from the route. The system may periodically provide an estimated time that the perishable items may be kept in the vehicle, whether or not the driver chooses the optimal parking location, or not. The system may continue to monitor the external environment and the vehicle interior, and update the vehicle user of changes in the environment conditions. The system may provide an estimated time that the perishable items may be kept in the vehicle in a case that the vehicle is not parked in a spot determined as an optimal spot. The system may obtain permission to start the vehicle, or even move the vehicle, to extend the perishable time.

SUMMARY

An aspect is a system of temperature optimization in a passenger vehicle when transporting perishable items, including the passenger vehicle having predetermined storage compartments; an in-vehicle computer network connected to a plurality of sensors; and a display device in communication with the in-vehicle computer network. The display device obtains information about perishable items. The display device is configured to estimate time that the perishable items may be maintained in the vehicle. The display device is configured to update the user on the status of the perishable items.

An aspect is a method of temperature optimization in a self-driving vehicle when transporting perishable items along a route, wherein the vehicle has predetermined storage compartments and an in-vehicle computer network connected to a plurality of sensors, wherein a display device is in communication with the in-vehicle computer network, the method including obtaining, by the display device, information about perishable items; estimating, by the display device, time that the perishable items may be maintained in the vehicle. When the vehicle deviates from the route and parks in an location, monitoring, by the display device, the status of an external environment of the vehicle as it relates to the perishable items. When the display device determines that the external environment changes in status, the self-driving vehicle moves to a new location.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
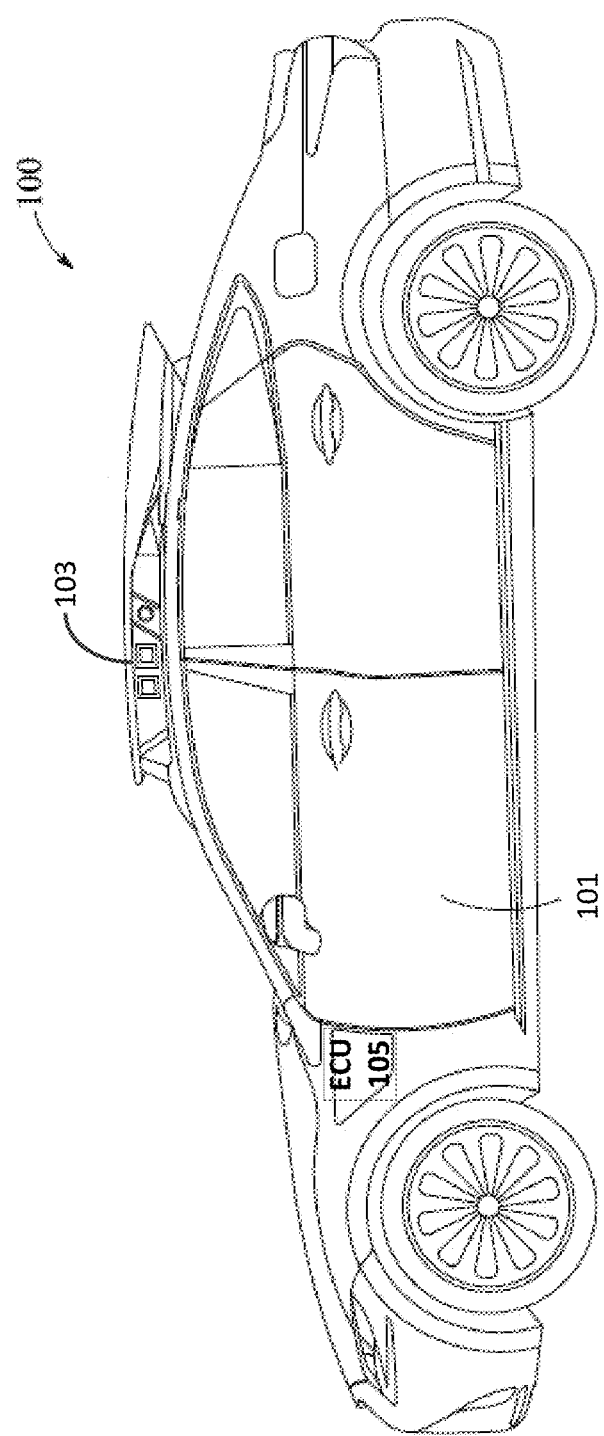
FIG. 1 illustrates a vehicle having an array of exterior sensors, such as those that may be found on a self-driving vehicle.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Aspects of this disclosure are directed to a system and method of determining an optimal location within a passenger vehicle to place perishable items for storage during a trip. An aspect is a system and method of determining an optimal parking location in cases where the passenger vehicle makes further stops along the route. An aspect is a system and method of starting and/or moving the vehicle while in a parking lot. A further aspect is a system and method that may alert the user of the vehicle to not purchase certain perishable food items while shopping due to an expected prolonged route and travel time of the vehicle.

FIG. 1 illustrates a passenger vehicle having an array of exterior sensors, such as those that may be found in a range of passenger vehicles ranging from those equipped with advanced driver-assist features to those equipped as a fully automated self-driving vehicle.

Referring to FIG. 1, a vehicle 100 includes an array of sensors 103 and a controller, ECU 105. Sensors may be mounted on a roof of a vehicle, mounted on the vehicle body 101, and may be included within the body of a passenger vehicle, or a combination thereof. The types of sensors that may be mounted on an exterior of a vehicle may include radar, LiDAR, video cameras, and sonar antennas. Video cameras, radar antennas, and sonar antennas may be located around a periphery of the vehicle. In particular, the passenger vehicle may be fitted with forward-looking cameras to detect traffic signals, as well as front-mounted sensors to detect other vehicles, pedestrians, and obstacles, or to determine traffic conditions, such as intersections and merging traffic lanes, in the vehicle's vicinity. The combination of sensors may be used to assist drivers in choosing the safest routes possible, or may provide information needed for operation of a fully autonomous vehicle. In particular, a passenger vehicle 100 may include other sensors for advanced control and navigation, including GPS, odometry and internal measurement units.

A passenger vehicle 100 may further include sensors such one or more thermometers for monitoring the cabin environmental conditions at different portions of the interior. The cabin of a vehicle may also include video cameras and infrared thermometer sensors for monitoring persons and other objects within the vehicle cabin. A passenger vehicle may include internal sensors for monitoring various conditions of the vehicle, such as steering angle and vehicle speed. Also, the vehicle engine may include various sensors for pressure, temperature, air flow and engine speed. Tires may include pressure sensors for measuring the tire pressure. Provided readings from some of the sensors, other parameters may be estimated or measured, which are referred to as estimators. For example, fuel usage rate may be estimated based on miles driven and change in fuel level reading. Also, temperature in the cabin may be measured as a heat map that is determined by several infrared thermometers positioned throughout the cabin.

Figure 2:
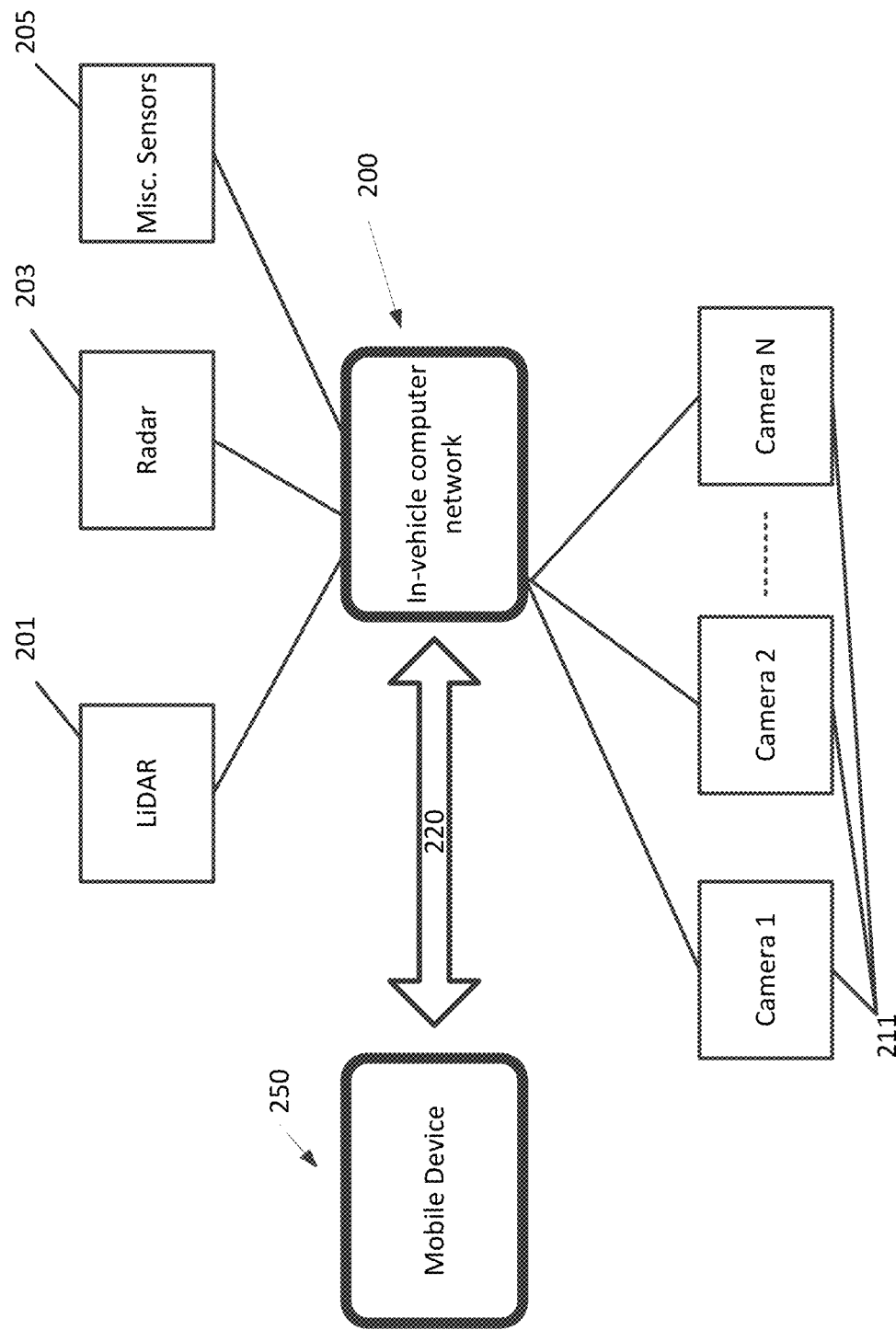
FIG. 2 is a block diagram of an in-vehicle network.

FIG. 2 is a block diagram of an in-vehicle network. The various vehicle sensors may be connected to one or more controllers by way of an in-vehicle network. In some embodiments, a passenger vehicle 100 typically has at least one controller module 105 that receives signals from the vehicle sensors 103 via an in-vehicle computer network 200. In some cases, sensors, such as a LiDAR 201, may include its own dedicated processor. Other sensors may include a radar 203 for detecting presence of an object. Other sensors 205 may include a vehicle Global Positioning System (GPS). One or more video cameras 211 may be mounted both on the exterior of the vehicle body and the interior of the vehicle cabin. The computer network 200 may include an interface for external communications 220, for example, communications with a mobile device 250, or other type of display device such as a tablet computer, Laptop computer, or smart watch.

Figure 3:
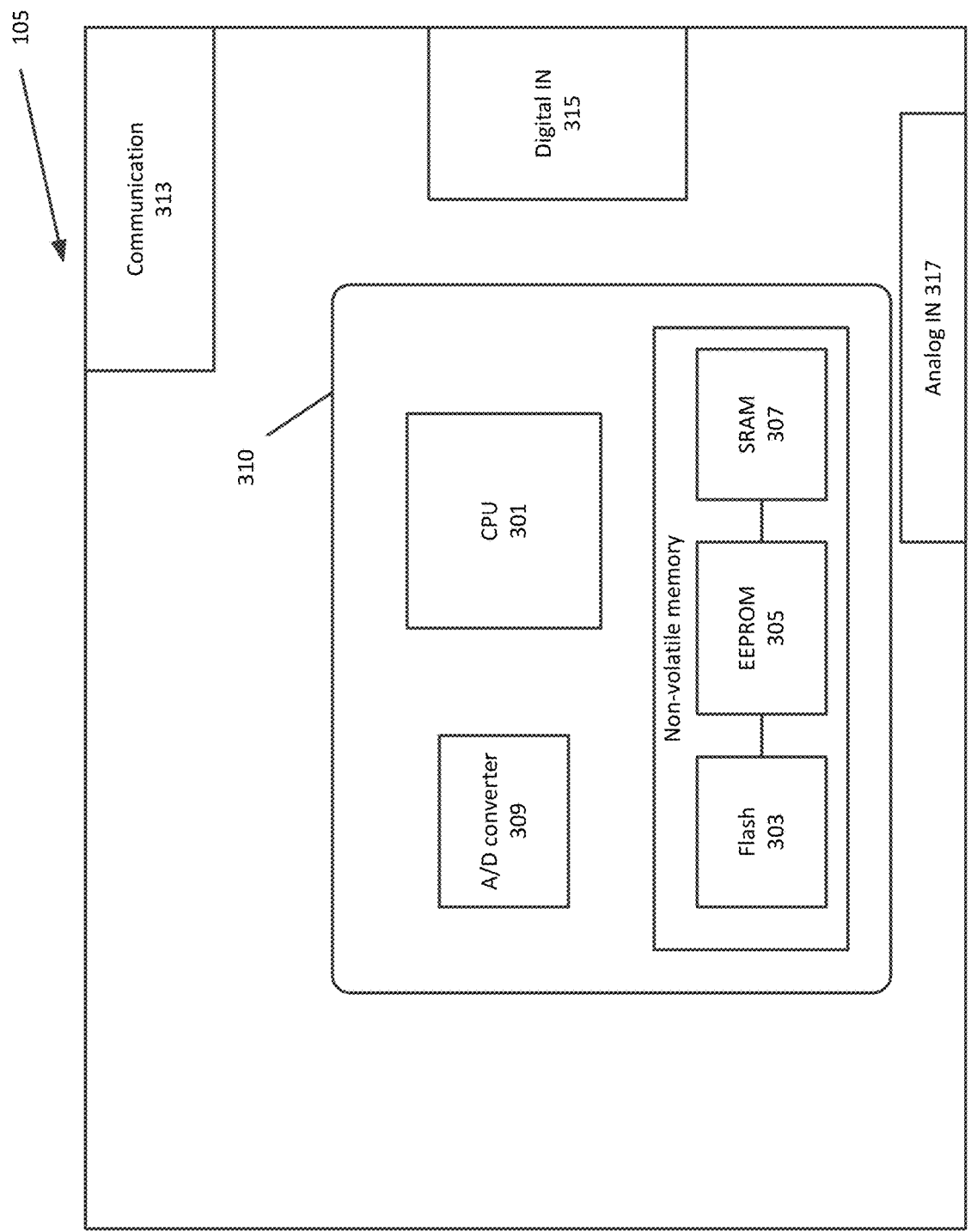
FIG. 3 is a block diagram of an electronic control unit of the vehicle.

A control module 105 of a vehicle, also referred to as an Electronic Control Unit (ECU), may control vehicle functions for purposes of safety, fuel efficiency, and for informing the driver of safety information, fuel efficiency, and other vehicle-related conditions. The control module 105 is not limited to a single unit and may include multiple ECU's distributed throughout the vehicle 100. The computer-based control system 105 may be based on a microcontroller. A microcontroller may contain one or more processor cores (CPUs) along with memory (volatile and non-volatile) and programmable input/output peripherals. Program memory in the form of flash, ROM, EPROM, or EEPROM is often included on chip, as well as a secondary RAM for data storage. In one embodiment, regarding FIG. 3 the computer-based system 105 is an integrated circuit board with a microcontroller 310. The board may include digital I/O 315, analog inputs 317, and hardware serial ports 313.

In one embodiment, the microcontroller is a RISC-based microcontroller having a flash memory 303, SRAM 307, EEPROM 305, general purpose I/O lines, general purpose registers, a real time counter, flexible timer/counters, and an A/D converter 309. The microcontroller may be a single system on chip (SOC). It should be understood that various types of microcontrollers may be used. Microcontrollers vary based on the number of processing cores, size of non-volatile memory, the size of data memory, as well as whether or not they include an A/D converter or D/A converter.

Figure 4:
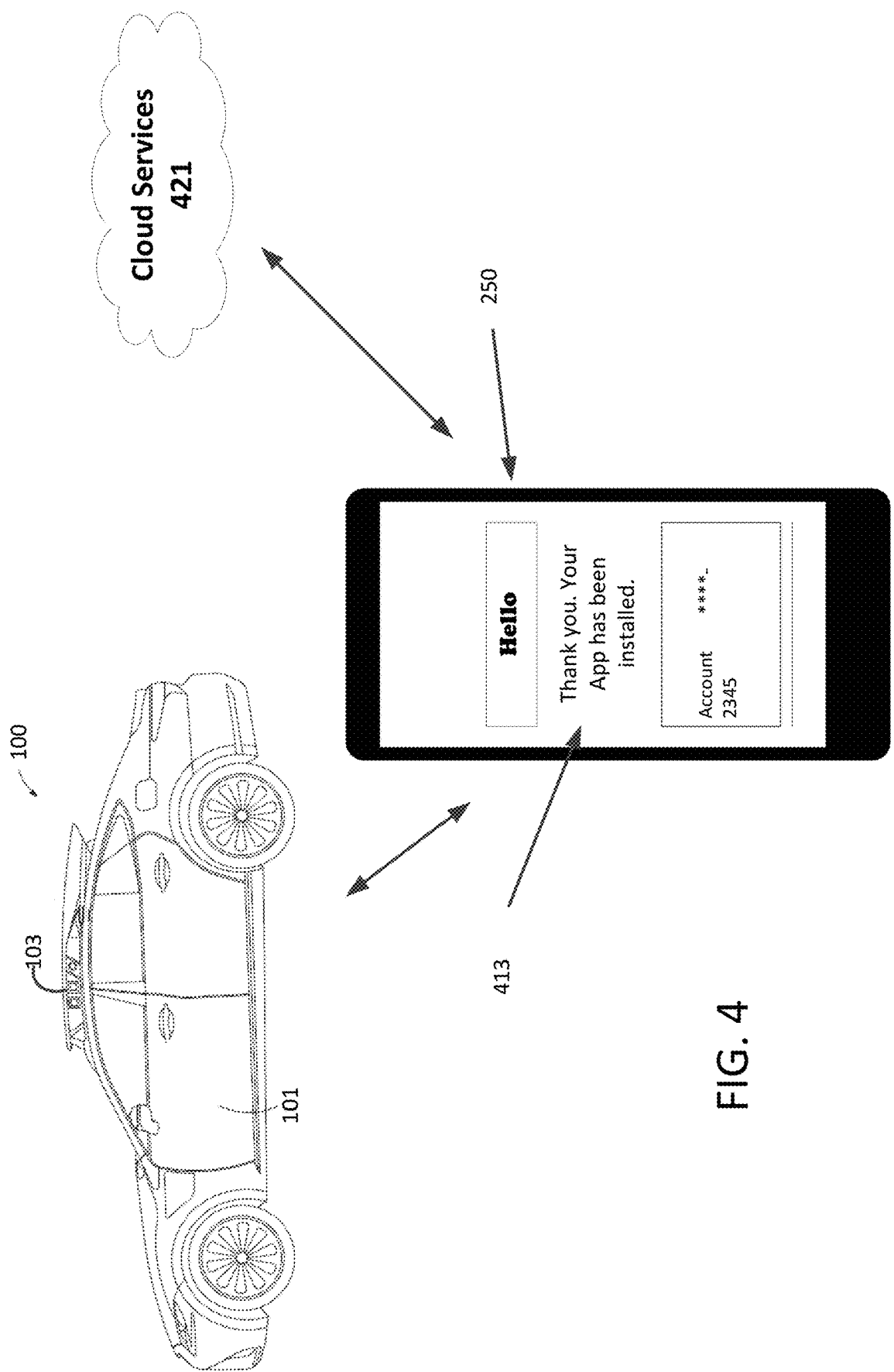
FIG. 4 is a system diagram for a vehicle having green temperature control.

FIG. 4 is a system diagram for a vehicle having green temperature control. In some embodiments, some data storage and data processing for green temperature control may be performed in a cloud service 421. The green temperature control is not limited to a cloud service 421, but may instead be performed in the mobile device 250 as a mobile application 413, also referred to as a mobile App or simply APP, or within the vehicle control module itself An interface to the green temperature control may be provided for the driver or vehicle user to enter desired conditions. At a time of entering a parking lot, an interface to the green temperature control may be provided that gives priority to parking spaces that are in a shaded location. In some embodiments, and interface to the green temperature control in the form of a list, table, or graphic of places to park that includes ratings/data of in-vehicle temperature changes presented to the driver or vehicle owner. The mobile device 250 may be a smartphone or a keychain fob that is configured with communications circuitry for accessing in-vehicle sensors via the vehicle ECU 105 and a user interface.

The mobile device 250 may be used to set up green temperature control for a passenger vehicle 100. In one embodiment, set up may involve registration of the vehicle with a temperature control service. The mobile device 250 may be provided with a mobile application 413 that includes a user interface for registration that may include entering a VIN of a car (type of vehicle). The vehicle VIN and other information entered in the user interface may be stored in a database. The other information may be static information about the vehicle, e.g., number of seats, sensors, space locations within the cabin and trunk, or dynamic information. The dynamic information may include sensor output information including environmental condition, LiDAR data, radar data, camera video data, GPS navigation information. The GPS information may also provide information about vehicle environment based on the location of the vehicle.

Figure 5:
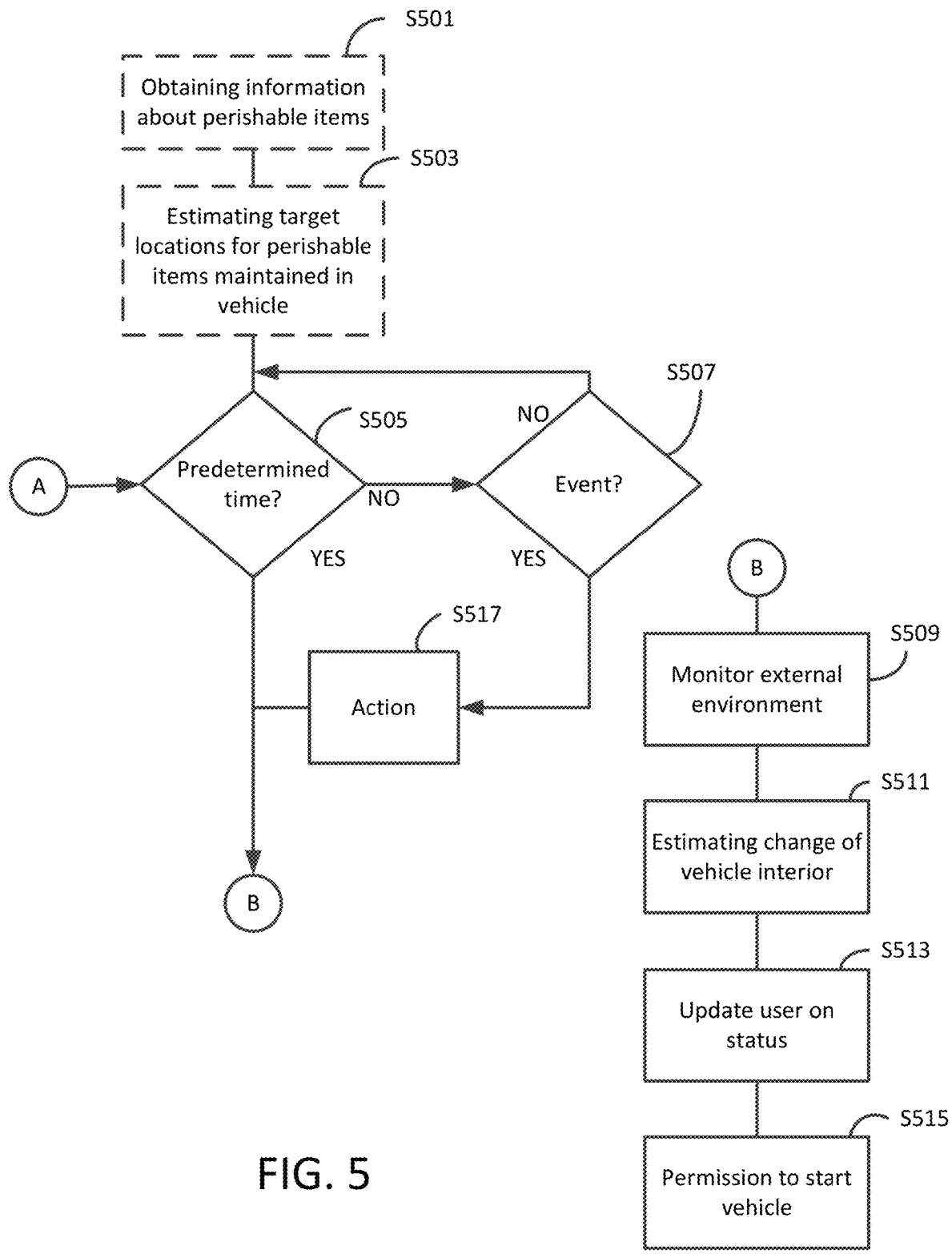
FIG. 5 is a flowchart for a method of operation of the system in accordance with an exemplary aspect of the disclosure.

FIG. 5 is a flowchart of a method of operation of the green temperature control system in accordance with an exemplary aspect of the disclosure. The method is performed by circuitry 105 of the vehicle control system 200 and circuitry of the mobile device 250, with information provided by a cloud service 421 as necessary. Although the green temperature control system is described as an approach to maintaining perishable items in a vehicle, in some embodiments a driver or vehicle user may use the green temperature control to monitor the interior of the vehicle, for example, so that the vehicle would not be too warm when the driver or vehicle user reenters the vehicle after being parked. The driver or vehicle user may wish to keep the vehicle out of direct sunlight as much as possible in order to protect the appearance and condition of the vehicle. In such cases, S501 and S503 may be optional steps. In S501, information is obtained about perishable items. In S503, the circuitry may estimate target locations where the perishable items preferably are to be stored in the vehicle. In S505, sensor readings may be periodically obtained from external sensors. In S507 certain events may occur before external sensor readings are obtained. When a predetermined time period is reached (YES in S505), in S509, sensor readings may be received from external sensors as information about the external environment of the vehicle. In S511, the circuitry 105 may estimate a change of the vehicle interior based on the information about the external environment. In S513, the circuitry 105 may transmit a message to the mobile device 250 to inform the user of a status of perishable items. When a certain event has occurred (YES in S507), an action may be taken based on the event. In S515, the circuitry 105 may transmit a message requesting permission to start the vehicle.

A more detailed description of the steps in FIG. 5 follows.

Further regarding S501, when shopping for perishable items, information may be available about the perishable items, for example information on the item label, information contained in a database of a grocery store, information available in a food distribution network, or information retrieved from the Web. The information about the perishable items may be accessed using a bar code or other identification information on a packaged item, or a bar code or other identification information on a shelf or sign adjacent to the perishable items.

A cloud service 421 may maintain a database containing general information about perishable items. For example, a database may contain critical temperatures of perishable items, which is a temperature that a perishable item must be used or consumed immediately because it cannot be reverted back to its original store-bought condition. In addition, a receipt obtained at checkout may be used to obtain identification information of perishable items that may be used to obtain further information about the perishable items.

Also, a critical temperature may be based on the length of time and temperature that a perishable item is stored. Although the shelf life of perishable food items until items become inedible depends on the type of food item and various environmental factors, the temperature has the greatest impact on the shelf life of perishable food. Perishable food items which have been kept in a temperature of between 5 to 60 degrees Celsius for between two to four hours cannot be put back in the refrigerator and must be consumed or discarded. Also, a temperature too high increases the growth of microorganisms, which can spoil some food products in a few hours or a couple of days. A temperature too low can create cold injuries.

In some embodiments, information about perishable items may be obtained from the store, market, grocery chain. A mobile application running in the mobile device 250 may connect to a database of the store, market, grocery chain central computer system, or other database that maintains inventory for the place of purchase of perishable items. In such case, as perishable items are being obtained in the store they may be scanned using the mobile application 413 as they are being placed into a cart. Information about the perishable items may be obtained from the inventory database based on scanned identification information.

In some embodiments, the APP is able to connect to a vehicle device or user's financial web service, so that after checkout, the mobile device is automatically sent a message from a business or financial institution, such as a credit card company, with the receipt, and then that receipt is matched to the database to provide information on the perishable items.

In some embodiments, a database of a store, market, grocery chain, or other place for obtaining perishable items may provide special handling instructions to the mobile application. The special handling instructions may include that the driver or vehicle user must wear gloves and/or a mask while handling the perishable item. The special handling instructions may include that the driver or vehicle user must not touch the perishable item or container of the perishable item. The special handling instructions may include that the driver or vehicle user must keep a predetermined distance (for example 3 to 6 feet) from others when obtaining the perishable item.

In other embodiments, information of perishable items may be obtained using a manual approach. In the manual approach, during checkout the store receipt may be scanned by the mobile application 413 to read a code or other item identification on the receipt. The item identification may be used to access the cloud database containing information about perishable items.

In still other embodiments, a picture of each item may be taken using a camera of the mobile device 250 and a machine learning system may be used to recognize the item. The machine learning system may be performed in the cloud service 421 or in the mobile device 250. The machine learning system may be any of several of supervised learning models and trained based on photographic images of perishable items at varying lighting conditions. A picture of an item to be purchased may be captured for the whole item, or just an image of the label, or product code associated with the item. For example, some products may be enclosed in containers, e.g. box or bag, and an image of the label on the box or bag may be captured.

In some embodiments, it may be possible to predict status of perishable items. The information of perishable items may include an approximate length of time that the perishable item may be maintained at a typical temperature, e.g., a range of 68 to 75 degrees Fahrenheit, before the item needs to be placed into an original environment that it was obtained from at a store, including a refrigerator, freezer, or a cool-dry place. The information may include an initial state of an item, such as days before expiration date, fresh or frozen, fresh produce, and/or light sensitive. The information may include an initial state of prepared foods, such as rotisserie chicken, hot pizza, etc., or types of food, such as Sushi or Sashimi, that contain raw fish, and sandwiches. The information may include preferable conditions for potted plants or flowers (cut, uncut). The information may also be for pastries, especially cakes that contain frostings or other toppings and fillings that may be sensitive to hot or cold temperatures.

In some embodiments, the perishable items may be human material, including bodily fluids, blood, organs, and the information may include condition and required storage environment for the human material. In some embodiments, the perishable items may be wild game or other edible items that are not normally carried in a store or market, but are to be transported back to a home. In the latter case, the information of the perishable items may include the approximate time between death of the wild game and placement of the game in the vehicle.

Figure 6:
FIG. 6 illustrates a user interface screen of a mobile application having an ordered list of perishable items in accordance with an exemplary aspect of the disclosure.

After obtaining information of perishable items, the perishable items may be ranked by most to least perishable. FIG. 6 illustrates a user interface screen of a mobile device application that provides a display of a list of perishable items ranked by most to least perishable 601. Items that are considered to be most perishable may be those that would rapidly diminish to a state that they would permanently irreversible in the least amount of time when kept at a typical temperature range in a vehicle. For example, some frozen foods may begin to defrost to a point where they cannot be refrozen, and must be consumed or discarded within a couple of days of purchase. The time period that frozen foods defrost to an irreversible state may be shortest among perishable foods, resulting in some frozen foods being ranked highest. Some foods that require refrigeration may become unusable after a certain amount of time being stored in a temperature range that is higher than refrigeration temperatures. The U.S. Food and Drug Administration recommends discarding milk if it has been left out above 40 degrees for two hours or more. In one embodiment, an automatic sorting system may be included in the trunk or rear storage area of the vehicle. The automatic sorting system may use the information regarding the perishable items to move the different items around so that they are grouped together by temperature. For example, all the frozen items would be in one area, all the refrigerated items would be in another area, and the non-perishable items would be in still another area, etc. This grouping strategy would leverage the inherent temperature of the items to collectively keep each other cold or cool (depending on frozen vs refrigerated). Grouping them in this way will keep them stay cooler longer. The automatic sorting system can operate using either a robotic arm to move the different object around into separate groups. Or, the floor of the trunk or rear storage space could be composed of a tessellation of small tiles that can move on the horizontal plane according to system instructions. The driver or vehicle user would simply have to place all items in the trunk. In one embodiment, the robotic arm may also be configured to remove the items from the bags before moving the tiles around to group them. In one embodiment, the tiles may include individual temperature modulation devices, for cooling and/or heating.

In some embodiments, circuitry, 105, 250, may determine environmental conditions inside and external to a vehicle together with a route and distance for a trip to a home or apartment, or other destination. Provided the environment information and distance in a trip, the mobile application 413 may provide an indication to the user that certain perishable items should not be purchased.

Typically, after purchase of the items, they are placed in a vehicle. Before being placed in the vehicle, the mobile application 413 running in the mobile device 250 may display an image of the top view of the interior of the vehicle, or may provide text names of compartments of the interior of the vehicle. The mobile application 413 may provide a recommended placement of perishable items, as a list of items in compartments shown in the image, or as a list of items in specific compartments of the interior of the vehicle. In the case that there may already be other items in certain compartments, the mobile application 413 may recommend second or third options for compartments for placing perishable items. In some embodiments, the recommended placement of perishable items may take into account a projected parking lot or other parking location that is expected along a route in accordance with intermediate points that are indicated in a planner/scheduler. The mobile application 413 may estimate whether the projected parking lot or other parking location will be shaded when the vehicle is expected to park.

In some embodiments, circuitry 105, 250 may recommend placement inside the vehicle that takes into consideration the number of passengers that are inside the vehicle and their respective sizes. As an example, if the circuitry 105, 250 detects that on a trip home, there are 2 people in the vehicle (driver+one small child in back left seat behind driver), the mobile application 413 may determine that the floor behind the passenger is the best spot because the child is small (using weight sensors and camera estimation) and not radiate a lot of heat. Alternatively, if there are 2 people in the vehicle (driver+large adult in back left seat behind driver), the mobile application 413 may determine that the floor in front of the passenger is the best spot because the rear passenger is large (using weight sensors and camera estimation) and will radiate a lot of heat, detrimentally affecting the perishability of the grocery items.

In some embodiments, circuitry 105, 250 may recommend placement based on expected conditions of the vehicle during a trip. The circuitry 105, 250 may estimate expected conditions based on information extracted from the driver or vehicle user's planner/scheduler/calendar application in their mobile device 250. The expected conditions may include that a parking lot is shaded, located underground, or is a parking deck. The expected conditions may include expected weather conditions. The expected conditions may include approximate amount of shading and direct sun along the route.

In some embodiments, perishable items may be grouped and bagged together at a checkout location. Preferably, perishable items are grouped and bagged with items of similar type. For example, preferably frozen perishable items are bagged together with other frozen items, while refrigerated items are bagged together with other refrigerated items. In such case, circuitry 105, 250 may recommend placement of bagged perishable items of similar type.

In cases where perishable items are spread out and bagged with various other products, the circuitry 105, 250 may recommend placement of perishable items including a recommendation to remove perishable items from their bags and/or re-bag perishable items into predefined groups of items. Re-bagged perishable items of similar type may then be provided with recommended placement locations as a group of items.

Compartments in a passenger vehicle may be characterized by storage space dimensions. Also, perishable items may be placed in a container, or in particular an insulated container such as a cooler, and the insulated container may be placed in the compartment. In some embodiments, time estimates for keeping perishable items in a vehicle may be limited to those items that are not stored in an insulated container.

Figure 7:
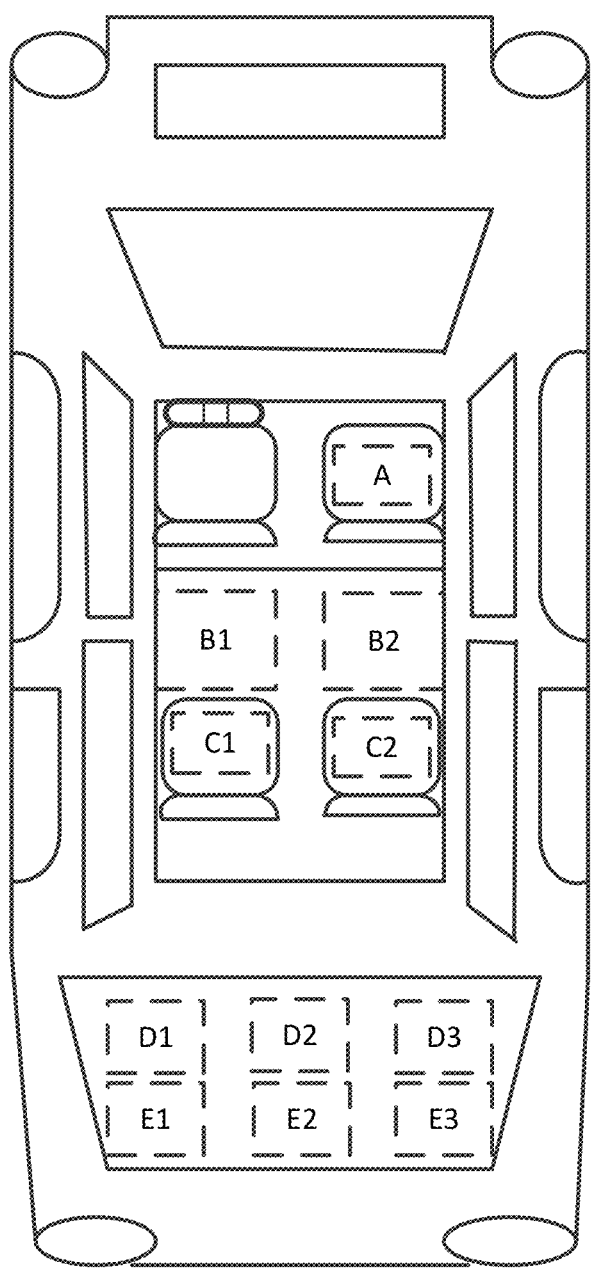
FIG. 7 illustrates a user interface screen of a mobile application having a top view of a vehicle having compartments in accordance with an exemplary aspect of the disclosure.

FIG. 7 illustrates a user interface screen of a mobile application 413 having a top view of a passenger vehicle having compartments in accordance with an exemplary aspect of the disclosure. The user interface of the mobile application 413 is configured to display a top view of a sedan with labeled compartments. Compartments of a passenger vehicle may include regions, such as driver-rear floor B1, driver-side passenger seat C1, passenger-rear floor B2, passenger-side rear passenger seat C2, and others depending on the vehicle type. The trunk may also be divided into compartments D1, D2, D3, E1, E2, E3.

Figure 8:
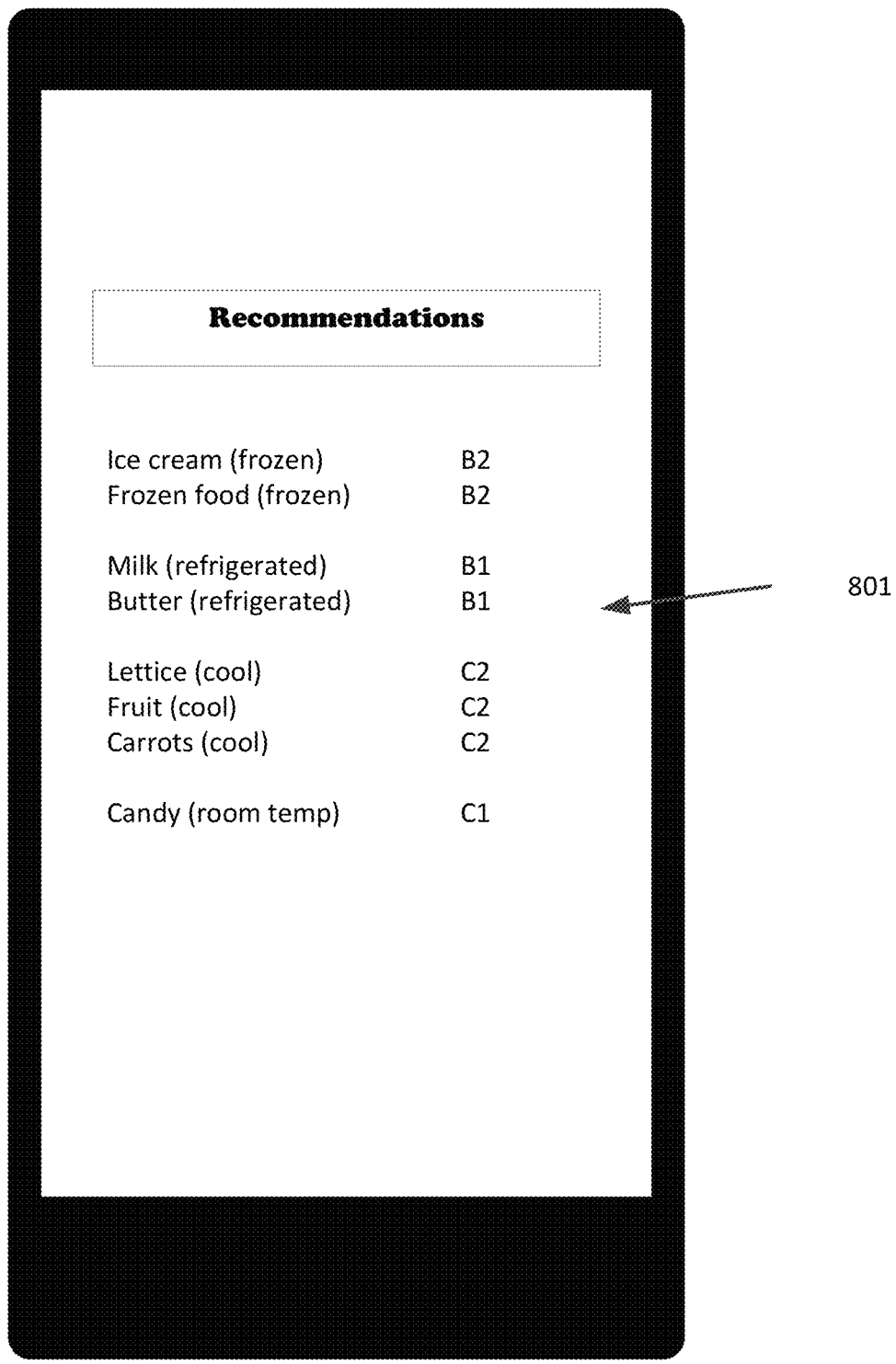
FIG. 8 illustrates a user interface screen of a mobile application having perishable items listed with vehicle compartment in accordance with an exemplary aspect of the disclosure.

FIG. 8 illustrates textual user interface screen of a mobile application 413 having perishable items listed by name with vehicle compartment in accordance with an exemplary aspect of the disclosure. The user interface displays a list view of location recommendations 801 including text compartment identifiers. Compartment identifiers may include names of compartments that are recognizable locations in a vehicle, such as left or right rear seat, location in a trunk or rear section. In a case that perishable items are bagged together, for example by a type such as frozen food items, refrigerated items, the perishable items may be listed in a group by type, where compartment identifiers are provided for each type.

In some embodiments, compartments may be defined by performing thermal imaging using, for example, an infrared thermal imaging camera that displays thermal imaging results based on temperature ranges. In addition to temperature ranges, other conditions may have an impact on items stored in a vehicle. For example, some items may be sensitive to light. In some embodiments, compartments may also be characterized by whether or not they have exposure to light.

In some embodiments, the mobile application 413 may be configured with a feature of confirming or denying the recommended placement of perishable items in certain compartments of the vehicle. The confirmation feature may be a displayed checklist in which a checkmark may be entered for a user to select a listed item as a way of verifying that the item has been placed in the indicated compartment. The mobile application 413 may be configured as a form in which if items are not placed in a recommended compartment, a user may enter the id of the compartment where the item is placed. If a user does not confirm placement of items in the vehicle, default environment conditions inside the vehicle may be used as the environment for the perishable items.

Once the perishable items are placed in the vehicle, the information of perishable items may include the initial state of the items: quantity of items, whether they are fresh or frozen. As described above, the information of the initial state may be obtained from a label associated with the perishable item, the receipt, or may be entered into the mobile application 413. The initial state may even take into account an estimated time between purchase in a store and placement in the vehicle. This time may be determined based on time of receiving a receipt and a time of placement in the vehicle using the mobile application 413 and may be determined based on time information maintained in the mobile device 250.

Further regarding S503, the mobile application 413 running on the mobile device 250, in S503, then estimates the time that each perishable item may be maintained in the passenger vehicle, and estimates a length of time that the vehicle will be driven based on a route to a destination location, such as a home or apartment. Initial estimates of length of time that each perishable item may be maintained in a passenger vehicle may be obtained from the database contained in the cloud service 421. The database may store predetermined time periods that perishable items may be stored at average room temperatures. Adjustments in the time period may be made based on previously determined average temperatures in a passenger vehicle.

Figure 9:
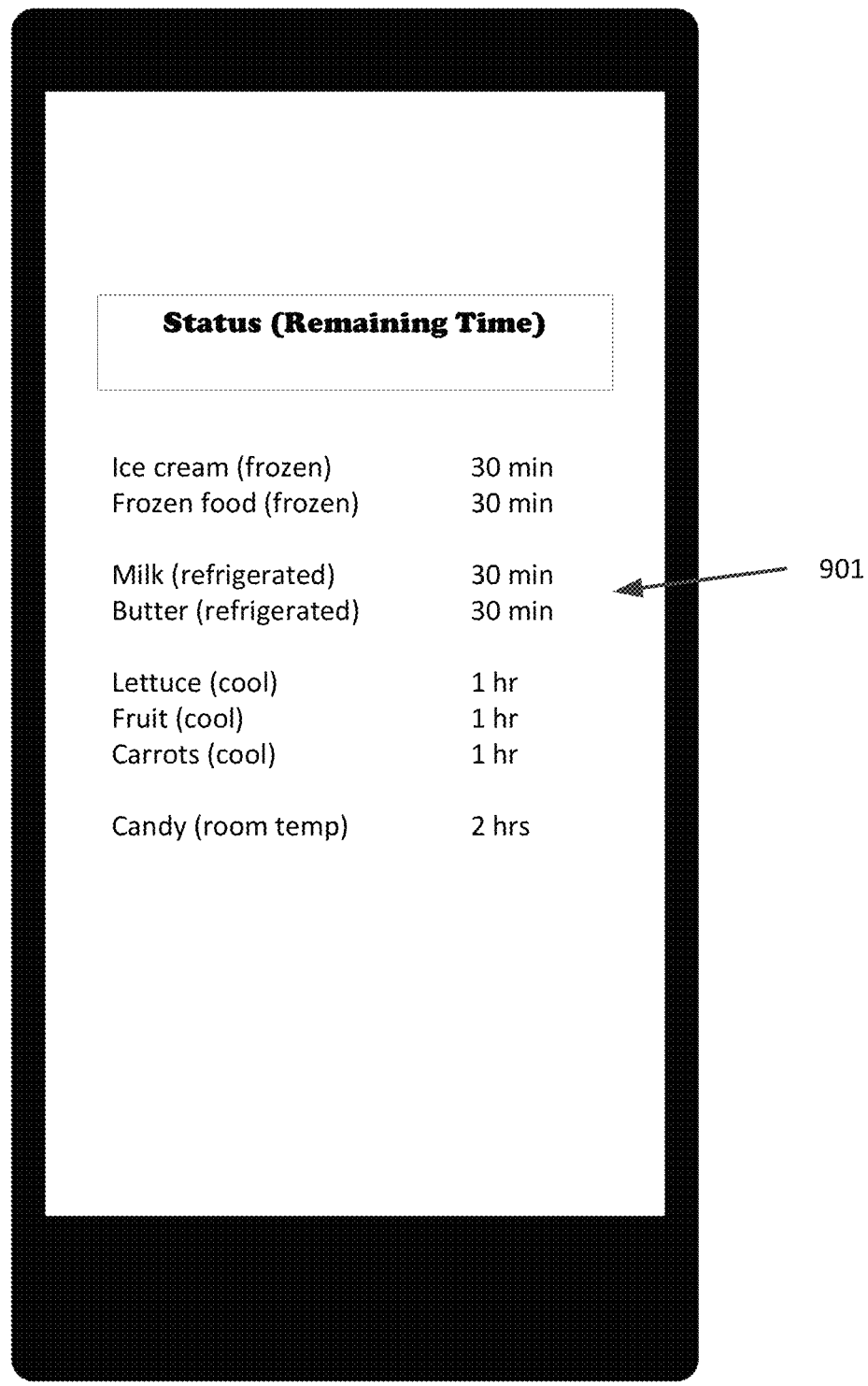
FIG. 9 illustrates a user interface screen of a mobile application displaying state of perishable items in accordance with an exemplary aspect of the disclosure.

FIG. 9 illustrates a user interface screen of a mobile application displaying state of perishable items in accordance with an exemplary aspect of the disclosure. The user interface displays an estimated time 901 that is calculated by the circuitry 105, 250 for each perishable item, or for types of perishable items, such as frozen, refrigerated, cool, room temperature. A display such as that in FIG. 9 may be used to display updated remaining times over the course of a trip including any intermediate parking of the vehicle. The route and time of travel may be obtained from a navigation system of the vehicle, or may be obtained from a map application performed in the mobile device 250.

Figure 10:
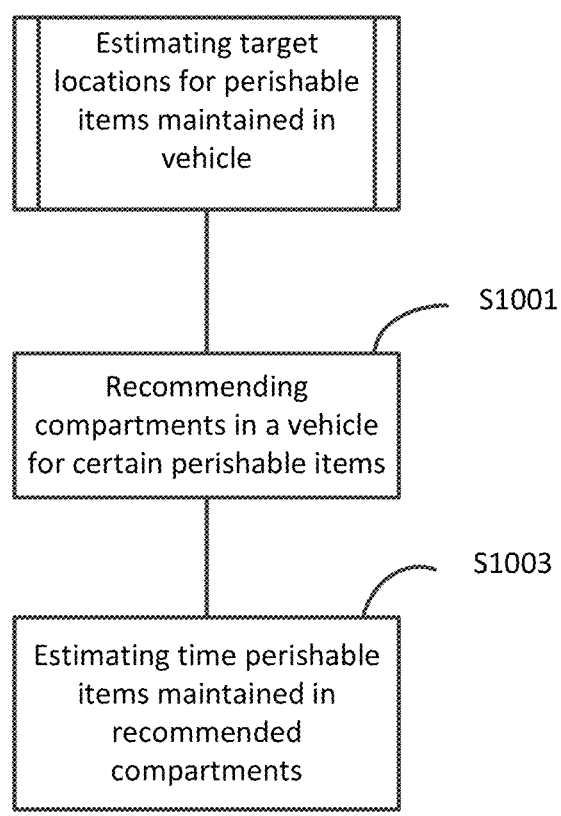
FIG. 10 is a flowchart for a method of estimating time perishable items maintained in the vehicle in accordance with an exemplary aspect of the disclosure.

FIG. 10 is a flowchart for a method of estimating locations where perishable items may be maintained in the vehicle. The mobile application 413 may, in 51001, recommend compartments in a vehicle for certain perishable items. The mobile application may maintain information on compartments including their average temperature, insulation features, and exposure to sunlight.

In S1003, the mobile application 413 may estimate the maximum time perishable items may be maintained in recommended compartments.

Further regarding S505, a determination may be made as to whether a predetermined amount of time has been reached. This predetermined time may be a periodic time that the status of the vehicle exterior and interior environment are checked by reading specific vehicle sensors. The predetermined amount of time may be a short interval that is in accordance with control of vehicle operation. Alternatively, the predetermined amount of time may be a longer interval that is sufficient for monitoring state of perishable items, such as every fifteen minutes, every half hour, or a fraction of a time for a trip.

[Event Monitoring]

While the vehicle is following a route, the mobile application 413 may monitor for events that may lead to a change in the time of the route and may involve periods of time where the vehicle is turned off. In some embodiments, events may be monitored within the vehicle control system 200 itself. Even if the predetermined amount of time has not been reached, in S507, other events may occur that require a check on the status of the vehicle exterior and interior environment, and may include:

(1) when the vehicle deviates from the route that is predetermined or that is determined when the vehicle begins a trip and stops to park at another parking space, for example, in another parking lot;

(2) when the vehicle engine is turned off for a certain period of time;

(3) when the driver or user exits the vehicle;

(4) a period of time that the driver or user is away from the vehicle;

(5) when the driver or user reenters the vehicle;

(6) a state in which the driver or user is inside the vehicle.

Regarding S517, actions may be taken when a given event is detected. For example, in the event (1) that the vehicle deviates from the route, the mobile application 413 may identify for the driver an optimal available parking spot to keep the perishable items fresh while the driver or vehicle user is away from the vehicle. The optimal parking spot may be determined not only on using meteorological information (sun trajectory, ambient temperature) but also static objects (buildings or trees, e.g., that provide shade) and dynamic conditions (such as adjacent or nearby vehicles that are providing shade but may move. As an example, when the vehicle deviates from the route home and enters a parking lot, the circuitry 105, 250 begins to determine the optimum available location in the parking lot to minimize temperature changes within the vehicle. The circuitry 105, 250 uses external vehicle sensors (e.g., cameras, LiDAR, radar, ultrasonic, GPS, etc.) to scan the external environment. The circuitry 105, 250 may determine the trajectory of the sun, the time of day, structures in and around the parking lot (e.g., buildings, trees, vehicles, etc.), heights of the structures, where shadows will occur, etc. The mobile application 413 may advise the driver or vehicle user where to park (e.g., next to a building, next to a large vehicle, etc.) to minimize temperature changes.

Further regarding S509, the vehicle may use sensors to monitor the external environment. Perishable food products kept at the proper temperature can remain of high quality for multiple days, or months in the case of frozen food. Frozen food or highly perishable food items should be kept in a freezer at −20 to −10 degrees Celsius. Other perishable food items require temperature between 1 and 5 degrees Celsius. Perishable food items which have been kept in a temperature of between 5 to 60 degrees Celsius for between two to four hours cannot be put back in the refrigerator and must be consumed or discarded. Further regarding S511, the mobile application 413 may receive the vehicle sensor information, and may use the sensor information to estimate the change in status of vehicle interior and possible effect on stored perishable items. Exterior conditions may include ambient temperature, whether the vehicle is in a shaded location or is exposed to direct sunlight, the time of year, weather conditions—rain, snow, cloudy, windy, etc. As will be described further, the exterior conditions may include a determination by the circuitry 105, 250 that the shaded condition is due to a nearby vehicle, nearby trees or bushes, or a building structure. As an example, the mobile application 413 continues to monitor the external environment (S509), the vehicle interior, and, in S513, updates the driver or vehicle user if anything changes, e.g., a nearby vehicle providing shade has left the parking lot, clouds roll in, etc.

Figure 11:
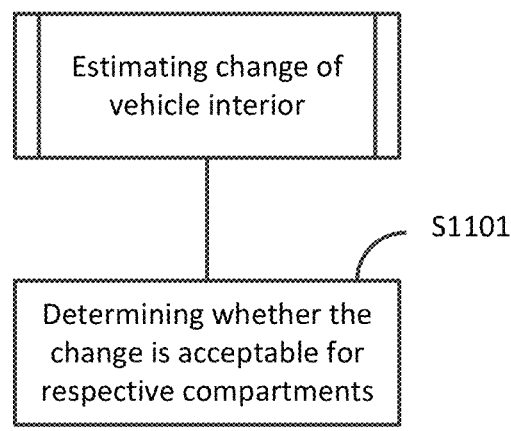
FIG. 11 is a flowchart for a method of estimating state of perishable items in the vehicle in accordance with an exemplary aspect of the disclosure.

FIG. 11 is a flowchart for a method of estimating change in the vehicle interior. In some embodiments, in S1101, the external environment is monitored to predict the effects on the internal environment of the vehicle, including radiant heat from direct sunlight. The mobile application may predict the effect of the ambient conditions overall as well as for specific compartments in the vehicle. This prediction may be used to predict the rate of temperature change for the perishable items and may provide estimates of times (e.g., times when the driver should leave the current store).

In some embodiments, the vehicle may be configured with infrared thermometers located, for example, in positions to take readings of perishable items in compartments of specific areas in the in the vehicle interior. In S1101, the mobile application 413 may determine whether the change in the vehicle interior is acceptable for respective compartments. For example, a frozen perishable item may be contained in a box having certain dimensions, such as 14"×14"×1". The mobile application may determine that if the perishable item remains in this current location for the trip (e.g., in a back seat on the floor), it will have direct exposure to the sun for approximately 17 minutes (based on sun trajectory, arrangement inside of the vehicle, and planned route home). With its current temperature of 34 degrees Fahrenheit, the mobile application may estimate that it will lose approximately 100 joules of energy to radiation and lose approximately 100 joules to conduction. The mobile application may determine that the temperature of the frozen perishable item will be 38 degrees by the time the vehicle arrives at home. The mobile application may determine that 38 degrees is acceptable without any adjustments to the interior of the vehicle.

In some embodiments, the vehicle may be configured with infrared thermometers located, for example, in positions to take readings of perishable items in compartments of specific areas in the in the vehicle interior. At least perishable items that have a greatest chance of reaching a critical temperature may have their temperature monitored and the circuitry 105, 250 may calculate an estimate of an amount of time to reach a critical temperature.

Figure 12:
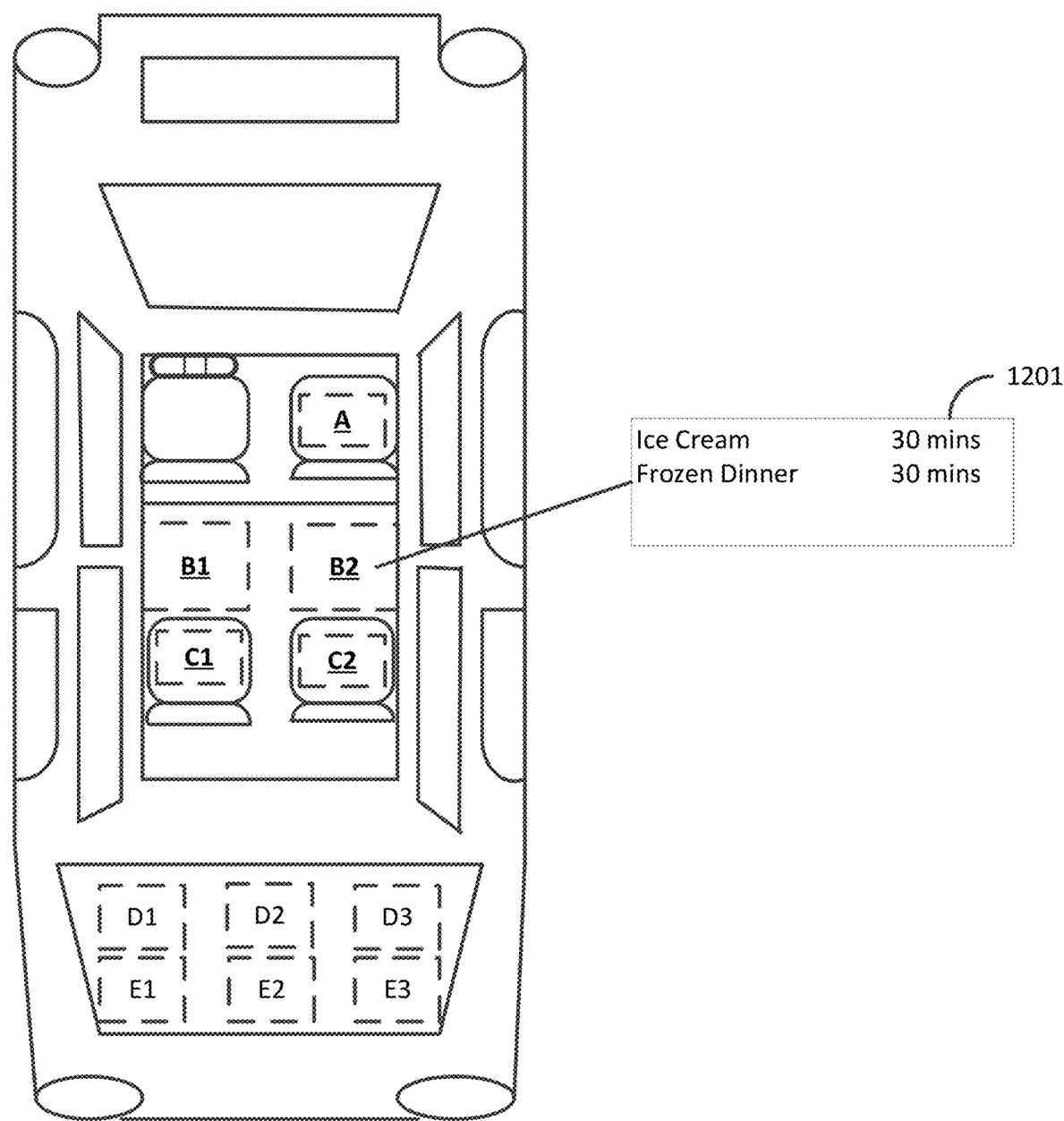
FIG. 12 illustrates a user interface screen of a mobile application displaying an interactive feature for accessing a list of perishable items stored in a vehicle compartment in accordance with an exemplary aspect of the disclosure.

Further regarding S513, the driver or user may be alerted of the status of stored perishable items (as in FIG. 9) due to changes in conditions of the interior environment of the vehicle. Conditions of the interior environment of the vehicle may change when a user turns on heat, then leaves the vehicle, which gets cold. Conditions of the interior environment of the vehicle may change due to time of day, GPS location, and arrival of nearby objects that are movable. In some embodiments, the mobile application 413 may display a notification message indicating that the driver or vehicle user should leave the current store by a certain time due to an expected time that one or more perishable items may reach a critical temperature. In some embodiments, a nearby truck may be identified and an estimate may be made to predict the likelihood that the vehicle will be moved and when. In some embodiments, the mobile application 413 may include an interactive display that enables a user to select a compartment in a graphical display of a vehicle in order to obtain updated status of perishable items stored in the compartment. FIG. 12 illustrates a user interface screen of a mobile application displaying an interactive feature for accessing a list of perishable items stored in a vehicle compartment in accordance with an exemplary aspect of the disclosure. The user interface displays a top view of a vehicle in which a compartment may be selected to show a list 1201 of perishable items and their updated status.

Figure 13:
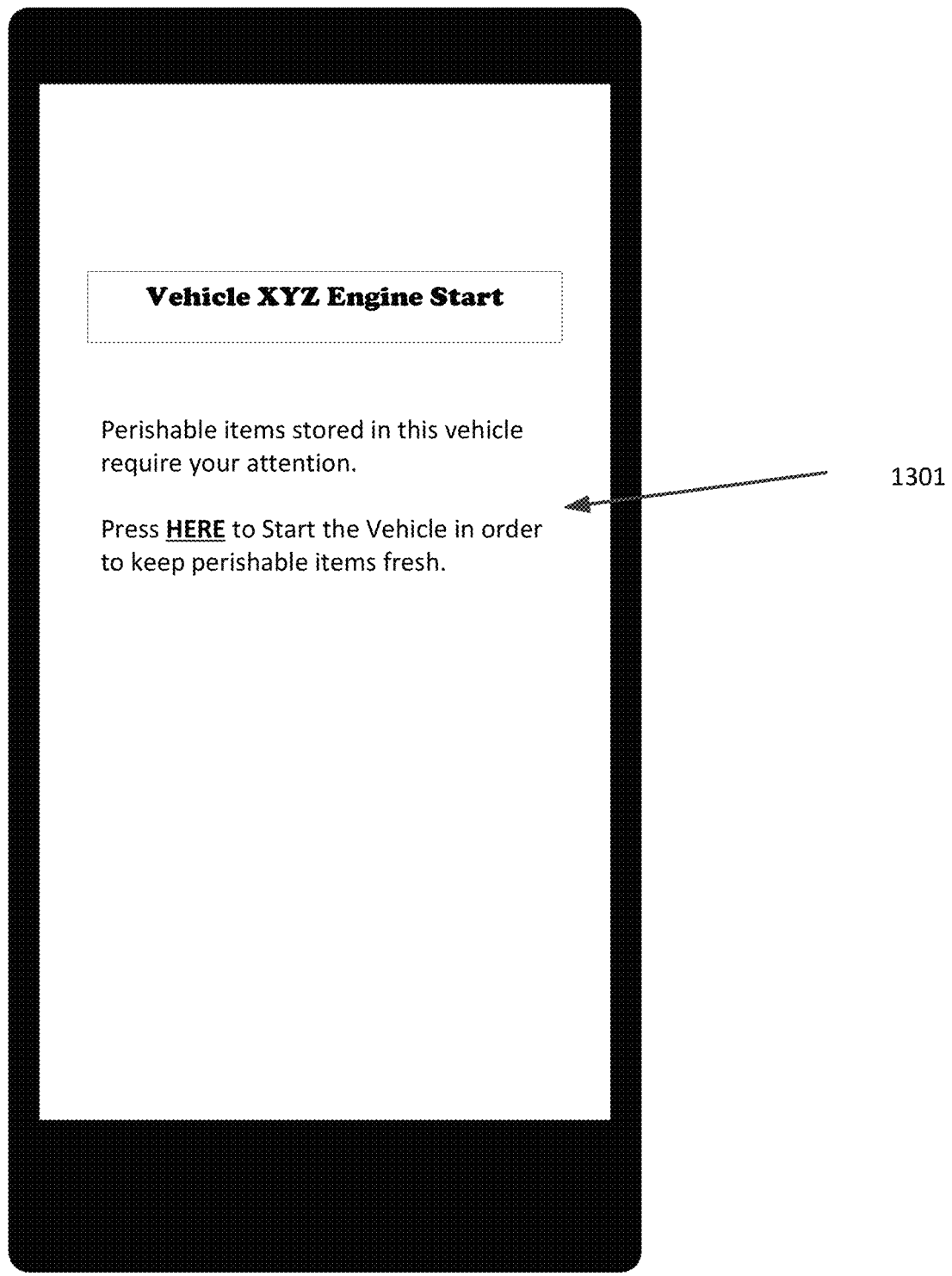
FIG. 13 illustrates a user interface screen of a mobile application for obtaining permission to start a vehicle in accordance with an exemplary aspect of the disclosure.

In some embodiments, a passenger vehicle 100 may be one that includes a remote start feature. The mobile application 413 may make a determination that it may be beneficial to one or more of the perishable items to start the vehicle's engine to bring the temperature of the interior of the vehicle to a desirable range. In one embodiment, the mobile application 413 may obtain permission from the vehicle user to start the vehicle and modify the internal temperature of the vehicle in an effort to extend the perishable time. In S515, the mobile application 413 may display a request message requesting permission to remotely start the vehicle while in a parking lot. FIG. 13 illustrates a user interface screen of a mobile application for obtaining permission to start a vehicle in accordance with an exemplary aspect of the disclosure. The exemplary user interface displays a message 1301 requesting permission to remotely start a vehicle. Other approaches to request a remote start of a vehicle may include a blinking indicator light, a text message in a messaging App, or via a message or a command sent to a remote start device.

Figure 14:
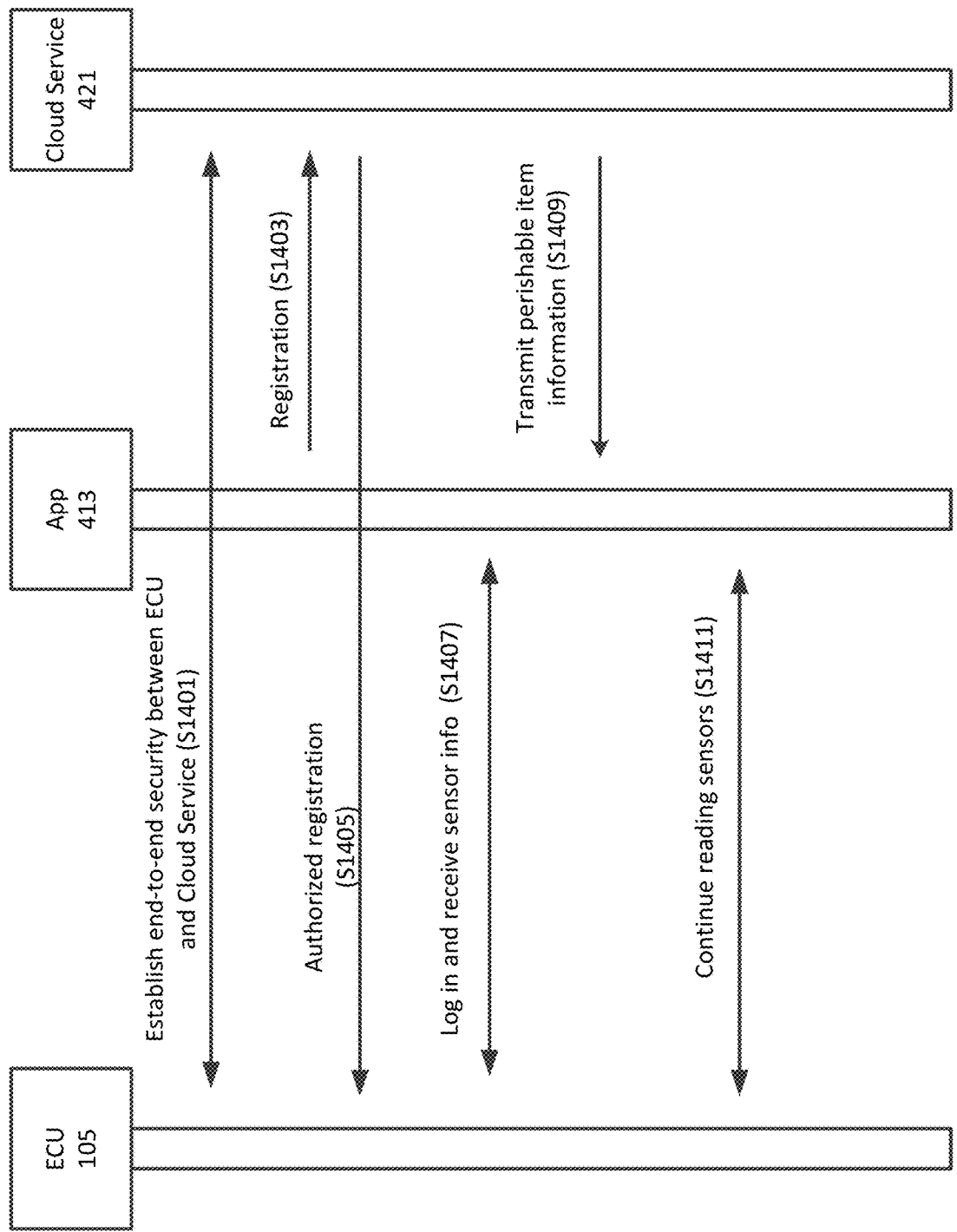
FIG. 14 is a flow diagram for a method of performing green temperature control in accordance with an exemplary aspect of the disclosure.

FIG. 14 is a flow diagram for a method of performing green temperature control in accordance with an exemplary aspect of the disclosure. The method may involve a vehicle ECU 105, a mobile application 413 and a cloud service 421.

In order to set up the green temperature control to access in-vehicle sensor information, in S1401, end-to-end communications security is first established between the cloud service 421 and the ECU 105 of a vehicle. In some embodiments, the end-to-end security includes secure communications via factory installed Internet communications using Transport Layer Security. In particular, the cloud service 421 and the ECU 105 perform a handshaking procedure in which various parameters to establish the connection's security are agreed on.

In S1403, an end-user of the green temperature control may download and install a mobile application 413 and register the mobile application 413 with the cloud service 421. In S1405, the vehicle ECU 105 may authenticate the registration in order to permit the mobile application 413 to access vehicle sensor data. The registration may involve setting a user name and password for logging into the green temperature control.

In S1407, the mobile application 413 may log into the green temperature control and begin receiving sensor data from the vehicle ECU 105. The sensor data may be video images of the area around the perimeter of the vehicle that may be used to monitor the environment. In addition, the mobile application 413 itself may provide information about the environment. For example, the time of year, time of day, and GPS location may be obtained from the mobile device 250 and a GPS circuit of the mobile device 250.

In S1409, information related to perishable items may be input into the mobile application 413, and some information of perishable items may be obtained from a database maintained in the cloud service 421. In some embodiments, the mobile application 413 may take into consideration a time between purchase of a perishable item(s) and placement in the vehicle. The time of purchase may be determined based on the store receipt.

In 51411, the mobile application 413 will continue to receive sensor data as required. In some embodiments, the sensor data may include image data of objects that are nearby the vehicle. The objects may include stationary objects or movable objects. In the case of a movable object, the sensors such as a video camera may monitor a nearby vehicle, such as a car or truck that may be blocking direct sunlight (and providing shade). The mobile application 413 or cloud service 421 may be configured to monitor the movable vehicle and estimate the likelihood that the vehicle will move and the time that the vehicle will move. In some cases, the type of vehicle may provide an indication of when the vehicle will be moved. For example, a commercial delivery vehicle, such as a UPS truck, Fedex truck, Mail truck may remain parked for only a short time. In some embodiments, the mobile application 413 may be configured with direct access to a tracking system, for example, by way of an account with UPS, FedEx, U.S. Postal Service, or other delivery service. Other types of commercial work trucks may also remain parked for only a short time. Also, some parking lots may have time limits for parking, such as 30 minutes, 1 or 2 hours. In some cases, parking spaces may be paid spaces, having maximum parking times. These time limits may be used to estimate the time that a movable vehicle may be moved.

Figure 15:
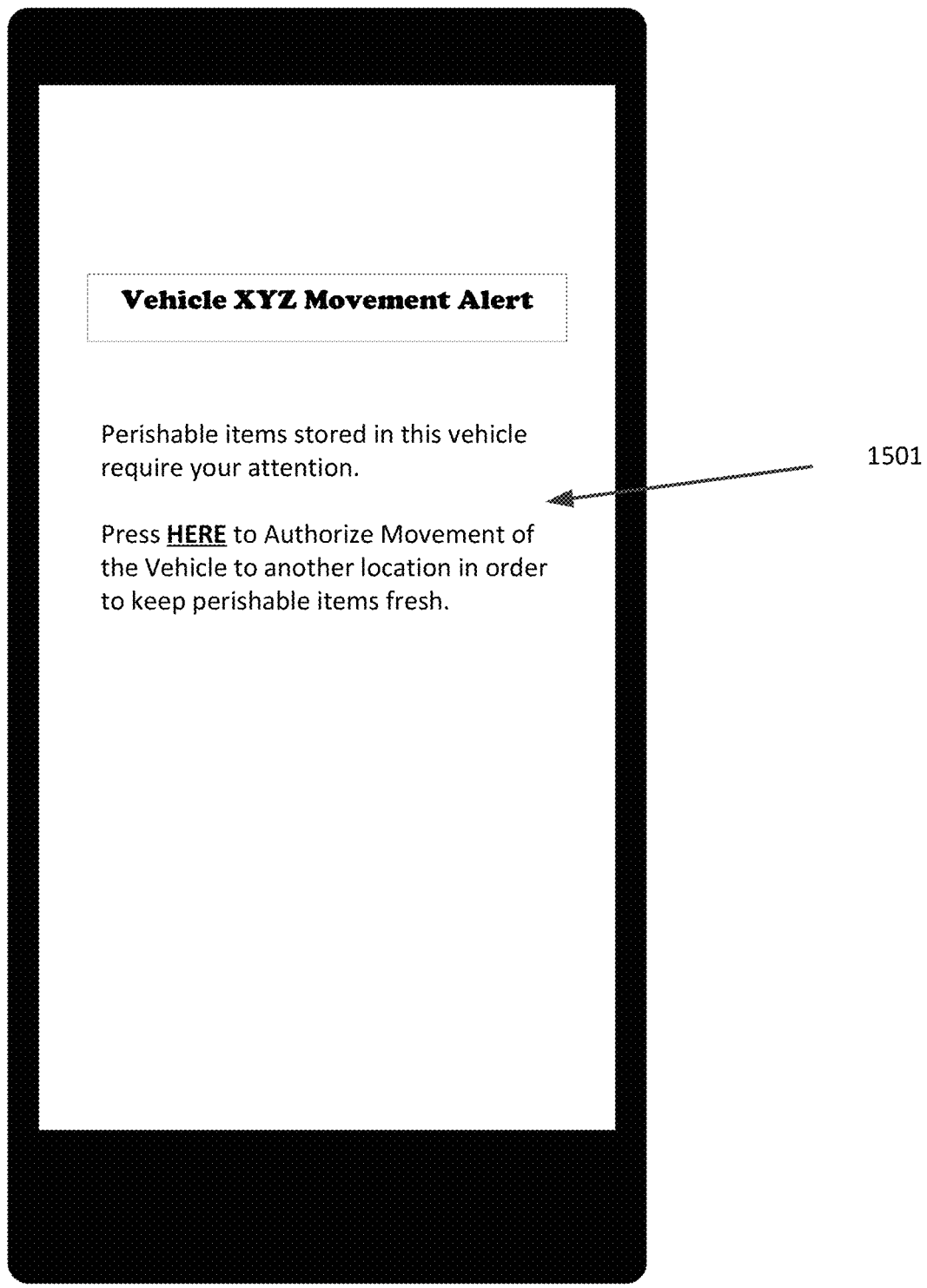
FIG. 15 illustrates a user interface screen of a mobile application for obtaining permission to move a vehicle in accordance with an exemplary aspect of the disclosure

FIG. 15 illustrates a user interface screen of a mobile application for obtaining permission to move a vehicle in accordance with an exemplary aspect of the disclosure. In some embodiments, a vehicle may be one that is fully autonomous, or at least a vehicle that includes an automatic parking system. The autonomous vehicle may be moved based on a remote command, as well as be remotely started. Also, before being moved, a request message 1501 may be sent to a mobile device 250 to obtain authorization to move the vehicle.

Before moving the autonomous vehicle 100, a vehicle position determination may be performed, i.e., both identifying for the driver or vehicle user the best available parking spot to keep the perishable items fresh while the driver is away from the vehicle and identifying while the driver or vehicle user is away from the vehicle if a more optimal parking spot exists based on static and dynamic environmental conditions and then actually moving the vehicle to that spot. The target parking spot may be determined not only on using meteorological information (sun trajectory, ambient temp) but also information of static objects (buildings or trees, e.g., that provide shade) and information on dynamic conditions (like nearby vehicles that provide shade but may be moved).

Figure 16:
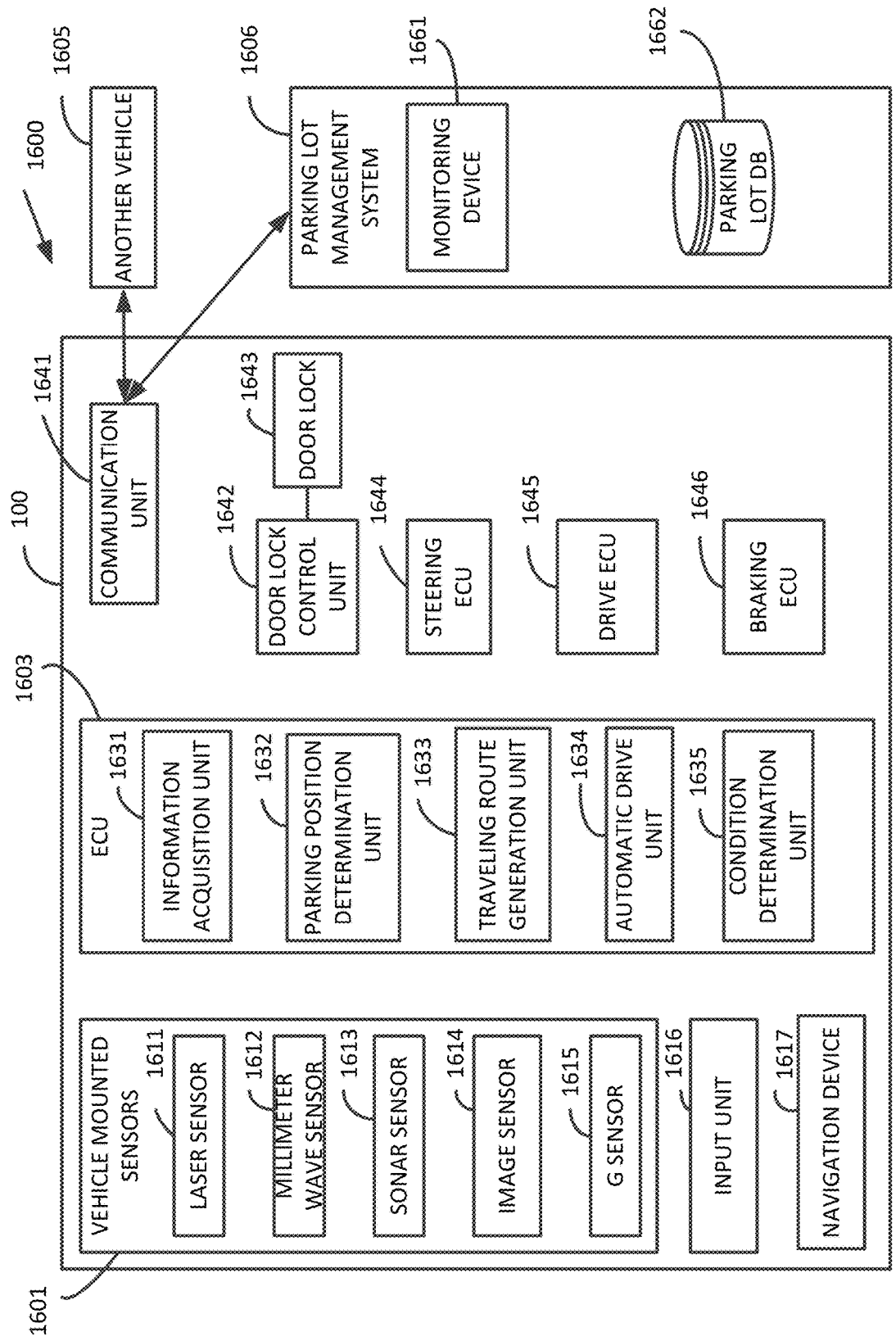
FIG. 16 is a schematic diagram of an automatic parking system in accordance with an exemplary aspect of the disclosure.
Figure 17:
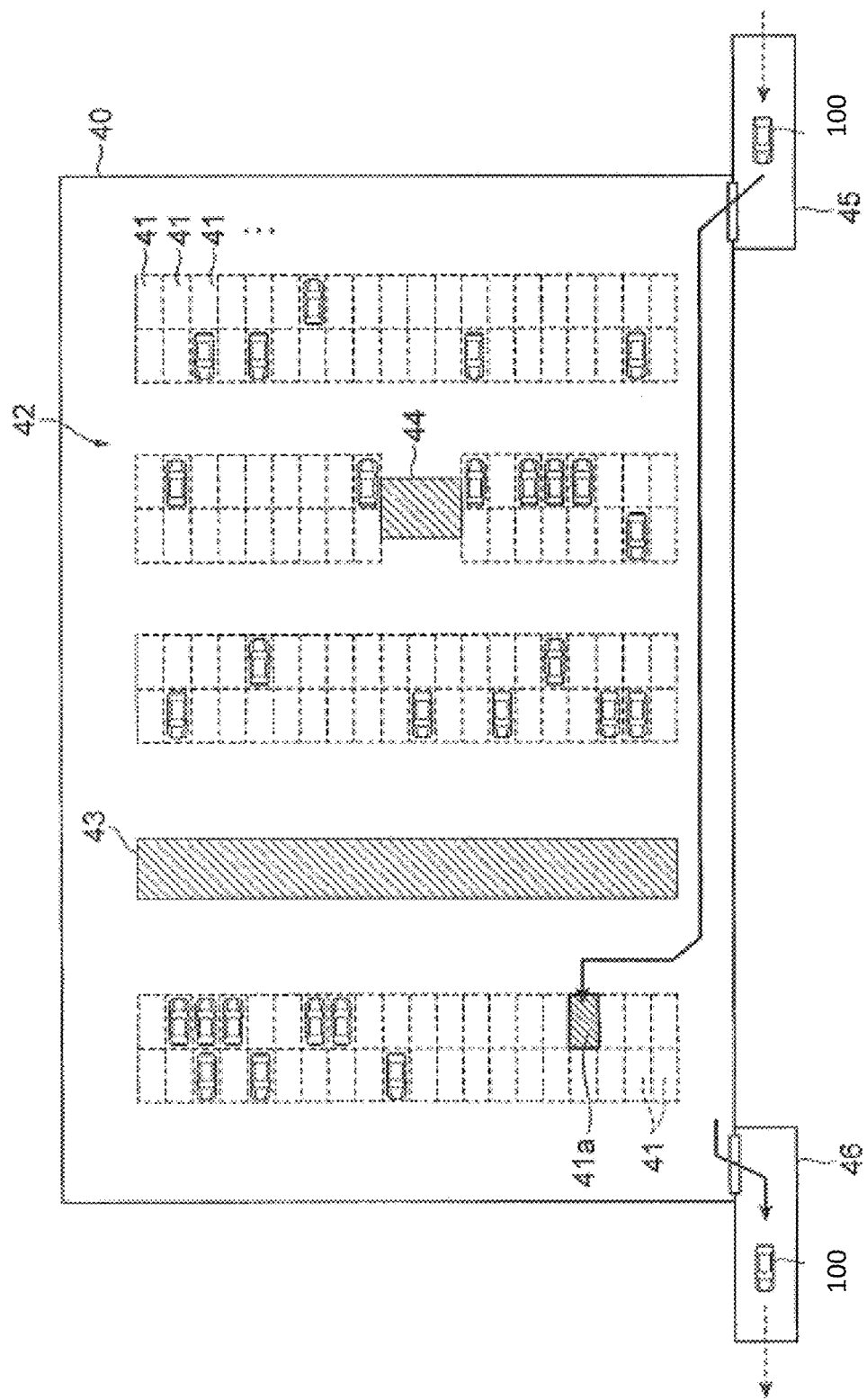
FIG. 17 is a schematic diagram explaining parking using the automatic parking system.

In order to move to the target parking spot, the vehicle itself, or in conjunction with a parking monitoring system, may determine a route to the target parking position and manage the vehicle movement in conjunction with other moving vehicles and objects. An automatic drive control means the control causing the vehicle 100 to travel in a state where intervention is not performed by the driver. FIG. 16 is a schematic diagram of an automatic parking system 1600 in accordance with an exemplary aspect of the disclosure. FIG. 17 is a schematic diagram explaining parking using the automatic parking system 1600.

In the automatic drive control, the vehicle 100 in the parking lot 40 is caused to travel from a current position to a target position in the parking lot 40. The current position is a position where the automatic drive control starts, and is, a parking space 41 in which the vehicle 100 is currently parked. The target position is a position where the automatic drive control ends, and is, for example, the parking space 41 in which the vehicle 100 attempts to park or the boarding position described above. In addition, the removal position described below is also included in the target position. The automatic parking control means the control causing the vehicle 100 to be parked using the automatic drive control in a state where intervention is not performed by the driver.

As illustrated in FIG. 16, the automatic parking system 1600 includes an electronic control unit (ECU) 1603 that controls the vehicle 100 and a parking lot management system 1606 that has a monitoring device 1661. The ECU 1603 is a vehicle-mounted device mounted in the vehicle 100 which is the parking control subject. The ECU 1603 is an electronic unit for executing the automatic drive control (automatic parking control), and is formed of a computer including a CPU, and a ROM or a RAM. The parking lot management system 1606 is a management system that is, for example, provided with respect to the parking lot 40 and manages vacancy information of the parking lot 40 and the like.

The vehicle 100 has a vehicle-mounted sensor 1601, an input unit 1616, a navigation device 1617, and a communication unit 1641. The vehicle-mounted sensors 1601 are sensors mounted in the vehicle 100. The vehicle-mounted sensors 1601 include, for example, a sensor that detects an object (an obstacle or white lines) around the vehicle 100 and a sensor that is used for detecting whether or not the vehicle 100 is in contact with the obstacle. The obstacles are objects in the parking lot 40 such as another vehicle 1605, the shielding wall 43 and the strut 44. For example, a laser sensor 1611, a millimeter wave sensor 1612, and a sonar sensor 1613 or an image sensor 1614 are included in the sensor that detects the object around the vehicle 100. The sensor that detects the object around the vehicle 100 outputs position information of the object around the vehicle 100 (including a relative distance), relative speed as the detection result, or the like. For example, an acceleration sensor (G sensor) 1615, a pressure sensor, or the like is included in the sensor that is used for detecting whether or not the vehicle 100 is in contact with the obstacle. The vehicle-mounted sensors 1601 output a detection signal to the ECU 1603.

The input unit 1616 is an interface to which the occupant's operation regarding at least the starting and ending of the automatic drive control (the automatic parking control) are input. Switches or a touch panel is included in the input unit 1616. The input unit 1616 outputs an operation signal to the ECU 1603.

The navigation device 1617 is a device that performs a route guidance of the vehicle 100, and for example, has map information. The navigation device 1617 is configured to include a global positioning system (GPS) so as to be able to acquire position information of the vehicle 100. The navigation device 1617, for example, displays the position of the vehicle 100 on a map as a display and performs the traveling guide or the travel guidance of the vehicle 100. In the navigation device 1617, the map data of the parking lot 40 may be stored in the map storage unit of the navigation device 1617 in advance. The navigation device 1617 outputs a vehicle position information signal to the ECU 1603.

The communication unit 1641 is communication means for communicating with devices outside the vehicle 100, and has, for example, a function (road-to-vehicle communication function) of communicating with the parking lot management system 1606. In addition, the communication unit 1641 may have a function (vehicle-to-vehicle communication function) of communicating with another vehicle 1605. The communication unit 1641 outputs various signals to the ECU 1603.

The ECU 1603 includes an information acquisition unit 1631, a parking position determination unit 1632, a traveling route generation unit 1633, an automatic drive unit 1634, and a dynamic condition determination unit 1635.

The information acquisition unit 1631 acquires information items from various devices. For example, the information acquisition unit 1631 acquires information items needed for the automatic drive control (automatic parking control) from the vehicle-mounted sensor 1601, the input unit 1616, the navigation device 1617, and the communication unit 1641.

The parking position determination unit 1632 has a function of determining the target parking space 41a. The target parking space 41a is a parking space 41 that becomes the target position of the automatic parking control. For example, the parking position determination unit 1632 determines the target parking space 41a based on the information acquired by the information acquisition unit 1631. As one of a specific example, the parking position determination unit 1632 may recognize a vacancy of the parking space 41 based on the detection result of the vehicle-mounted sensor 1601, and may determine the target parking space 41a among the vacant parking spaces 41. Alternatively, the parking position determination unit 1632 may recognize a vacancy of the parking space 41 based on the monitoring result of the monitoring device 1661 and may determine the target parking space 41a among the vacant parking spaces 41. In addition, the parking position determination unit 1632 may also determine the predetermined parking space 41 acquired via the communication unit 1641 as the target parking space 41a.

The traveling route generation unit 1633 generates the traveling route based on the map data of the parking lot 40 acquired by the information acquisition unit 1631. The traveling route is, for example, the traveling route of the vehicle 100 from the entrance 45 to the target parking space 41a, the traveling route of the vehicle 100 from the currently parked parking space 41 to another parking space 41, or the traveling route of the vehicle 100 from the currently parked parking space 41 to the exit 46.

The automatic drive unit 1634 performs the automatic drive control (automatic parking control) of the vehicle 100 in the parking lot 40 from the current position to the predetermined target position (for example, target parking space 41a or the boarding position of the occupant) in the parking lot 40 based on the monitoring result of the monitoring device 1661. The automatic drive unit 1634 performs the automatic drive control of the vehicle 100 such that the vehicle 100 travels in accordance with the traveling route generated by the traveling route generation unit 1633. The automatic drive unit 1634 performs the automatic drive control by outputting a control signal to a drive ECU 1645, a braking ECU 1646, and a steering ECU 1644.

The dynamic condition determination unit 1635 performs the determination of a dynamic condition between the vehicle 100 in the automatic drive control and an obstacle, using the automatic drive unit 1634 based on the monitoring result of the monitoring device 1661 or the detection result of the vehicle-mounted sensors 1601 in the vehicle 100. The dynamic condition determination is the determination of whether or not the vehicle 100 is approaching the obstacle. The dynamic condition determination unit 1635 performs the determination of whether or not the vehicle 100 is approaching the obstacle based on the monitoring result of the monitoring device 1661 or the detection result of the vehicle-mounted sensors 1601 in the vehicle 100. The dynamic condition determination unit 1635 performs the dynamic condition determination based on, for example, an analysis result of an image using the camera of the monitoring device 1661. Alternatively, the dynamic condition determination unit 1635 performs the dynamic condition determination based on, for example, a detection result of the G sensor 1615.

In the dynamic condition determination, the determination that the condition between the vehicle 100 and the obstacle is predicted, is included. That is, the dynamic condition determination means that the vehicle 100 and the obstacle are predicted to be in contact. The dynamic condition determination unit 1635 determines that the contact between the vehicle 100 and the obstacle is predicted based on the monitoring result of the monitoring device 1661 or the detection result of the vehicle-mounted sensors 1601 in the vehicle 100. For example, the dynamic condition determination unit 1635 determines that the contact is predicted based on the analysis result of the image using the camera of the monitoring device 1661. Alternatively, the dynamic condition determination unit 1635 calculates a time to collision (TTC) between the vehicle 100 and the obstacle based on the detection result of the laser sensor 1611 or the millimeter wave sensor 1612, for example. In a case where the TTC is smaller than a predetermined contact determination threshold value, the dynamic condition determination unit 1635 determines that the contact is predicted. In a case where the dynamic condition determination is performed, the dynamic condition determination unit 1635 outputs a signal indicating the fact to the ECU 1603.

The automatic drive unit 1634 determines whether or not the contact determination is performed by the dynamic condition determination unit 1635. In a case where the contact determination is performed by the dynamic condition determination unit 1635, the automatic drive unit 1634 stops the vehicle 100. The automatic drive unit 1634 may perform the automatic drive control such that the vehicle 100 stops after returning to a driving change point in the automatic drive control immediately before the contact determination is performed by the dynamic condition determination unit 1635. The driving change point includes, for example, a point where the driving is changed to backward driving from forward driving, or a point where a steering angle is changed. Then, the automatic drive unit 1634 outputs a signal to the parking position determination unit 1632 so as to determine the removal position based on the monitoring result of the monitoring device 1661 or the detection result of the vehicle-mounted sensors 1601 in the vehicle 100. Then, the automatic drive unit 1634 causes the vehicle 100 to move to the removal position determined by the parking position determination unit 1632.

The parking position determination unit 1632 may acquire vacancy information of a parking space 41 based on the monitoring result of the monitoring device 1661 or the detection result of the vehicle-mounted sensors 1601 in the vehicle 100, and may determine whether or not a section is vacant using map data of the parking lot 40 including, for example, the information of the section provided for the emergency removal in the parking lot 40, and in a case where the section is vacant, the section may be determined as the removal position. By disposing indicators that can be detected by the vehicle-mounted sensors 1601 in the vehicle 100 in the section provided for the emergency removal, it can be determined whether or not the section is vacant based on the detection result of the vehicle-mounted sensor 1601 in the vehicle 100, and the section can be determined as the removal position without using the map data of the parking lot 40. Alternatively, the parking position determination unit 1632 may determine the position where the traveling of another vehicle 1605 is not interfered on the traveling path 42 in the parking lot 40 as the removal position based on the monitoring result of the monitoring device 1661 or the detection result of the vehicle-mounted sensor 1601 in the vehicle 100. For example, the parking position determination unit 1632 can determine the position where the traveling of another vehicle 1605 is not interfered as the removal position based on width information of the traveling path 42 acquired by the map data of the parking lot 40 and width information of the vehicle 100. Alternatively, by acquiring the width information of the traveling path 42 using the vehicle-mounted sensor 1601 in the vehicle 100, the position where the traveling of another vehicle 1605 is not interfered can be determined as the removal position.

In a case where there is a plurality of removal position candidates, the automatic drive unit 1634 may determine the removal position candidate nearest to the vehicle 100 as the removal position. Alternatively, in a case where there is a plurality of removal position candidates, the automatic drive unit 1634 may determine the removal position candidate of which the traveling route from the vehicle 100 to each removal position candidate is the shortest as the removal position.

The traveling route generation unit 1633 generates the traveling route from the current position of the vehicle 100 to the removal position based on the map data of the parking lot 40 acquired by the information acquisition unit 1631. In a case where it is determined that the vehicle 100 cannot travel on the generated traveling route due to the existence of an obstacle based on the monitoring result of the monitoring device 1661 or the detection result of the vehicle-mounted sensors 1601 in the vehicle 100, the traveling route generation unit 1633 causes the parking position determination unit 1632 to re-determine a new removal position. Alternatively, when the parking position determination unit 1632 determines the removal position, the parking position determination unit 1632 may determine the removal position such that the vehicle 100 can arrive at the removal position without being interfered by an obstacle.

The above-described information acquisition unit 1631, the parking position determination unit 1632, the traveling route generation unit 1633, the automatic drive unit 1634, and the dynamic condition determination unit 1635 may be formed of one electronic control unit or a plurality of electronic control units.

The vehicle 100 includes the door lock control unit 1642, the steering ECU 1644, the drive ECU 1645, and the braking ECU 1646. The door lock control unit 1642 controls a door lock state of the vehicle 100 based on the control signal from the ECU 1603. The automatic drive unit 1634 may make the door lock state of the vehicle 100 be in a locked state via the door lock control unit 1642 during the automatic drive control.

The steering ECU 1644 is an electronic control unit that performs the steering control of the vehicle 100, and controls the steering of the vehicle 100 by, for example, performing the drive control of a motor provided on the steering mechanism. This steering ECU 1644 executes the steering control based on the control signal from the ECU 1603.

The drive ECU 1645 is an electronic control unit that performs the traveling drive control of the vehicle 100, and performs the drive control of a motor or an engine mounted in the vehicle 100. This drive ECU 1645 executes the drive control based on the control signal from the ECU 1603.

The braking ECU 1646 is an electronic control unit that performs the braking control of the brake of the vehicle 100, and performs the braking control by, for example, adjusting the operation of a pump or a motor incorporated in a brake hydraulic circuit. This braking ECU 1646 executes the braking control based on the control signal from the ECU 1603.

Figure 18:
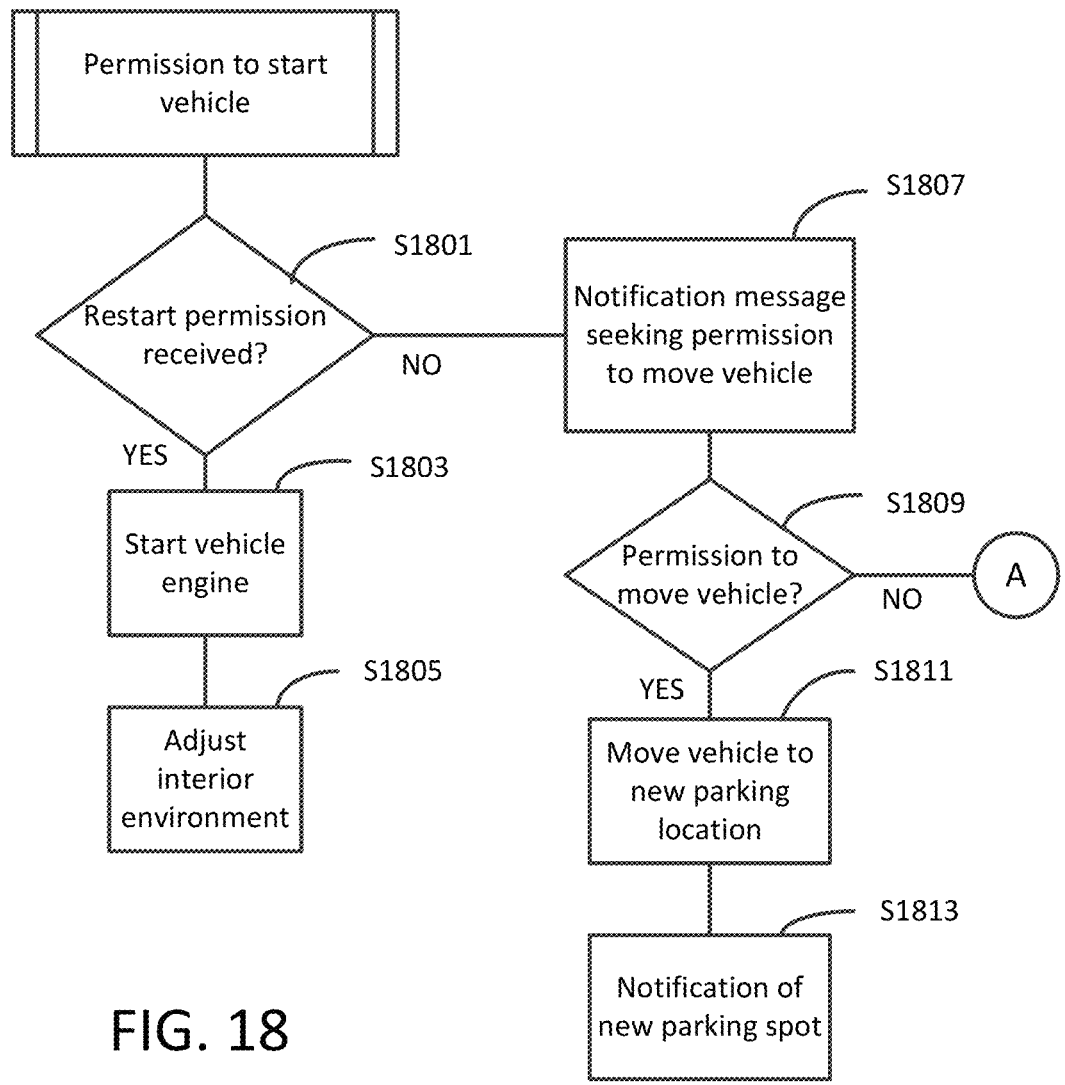
FIG. 18 is flowchart for a method of remote starting or moving of a vehicle in accordance with an exemplary aspect of the disclosure.

FIG. 18 is flowchart for a method of remote starting or moving of a vehicle in accordance with an exemplary aspect of the disclosure. The fully autonomous or vehicle with an automatic parking system may undergo remediation in an effort to sustain the environment of the vehicle interior for an extended period of time. The mobile application 413 may make a determination that it may be beneficial to one or more of the perishable items to start the vehicle's engine to bring the temperature of the interior of the vehicle to a desirable range. If permission is received to restart the vehicle (YES in S1801), in S1803, the vehicle engine is started. In S1805, upon starting the engine, the internal environment may be adjusted, for example by increasing the interior temperature.

A message may be provided to a user to seek permission for the autonomous vehicle to move to another location in an effort to improve the internal environment of the vehicle. If permission is received for the vehicle to move to another location (YES in S1809), in S1811, the vehicle engine is started and the vehicle moves in an autonomous fashion. In S1813, the circuitry 105, 250 may provide a notification of the new parking spot.

In some embodiments, permission to move the vehicle may be requested when conditions change, or the autonomous vehicle may choose the parking location based on desirable environmental conditions. In some embodiments, in S1807, the mobile application 413 may initially prompt the driver or vehicle user to set an automatic movement condition that the autonomous vehicle may move to a new location without seeking permission. In this later case, the step S1809 will check that the condition is set to automatic movement. Conditions that may change include the temperature of certain compartments, exposure of areas containing perishable items to direct sunlight, and temperature of certain perishable items. The circuitry 105, 250 may determine that the change in conditions may be remedied by moving the vehicle to another parking location. The circuitry 105, 250 may choose a parking location that will remedy the changed condition.

Figure 19:
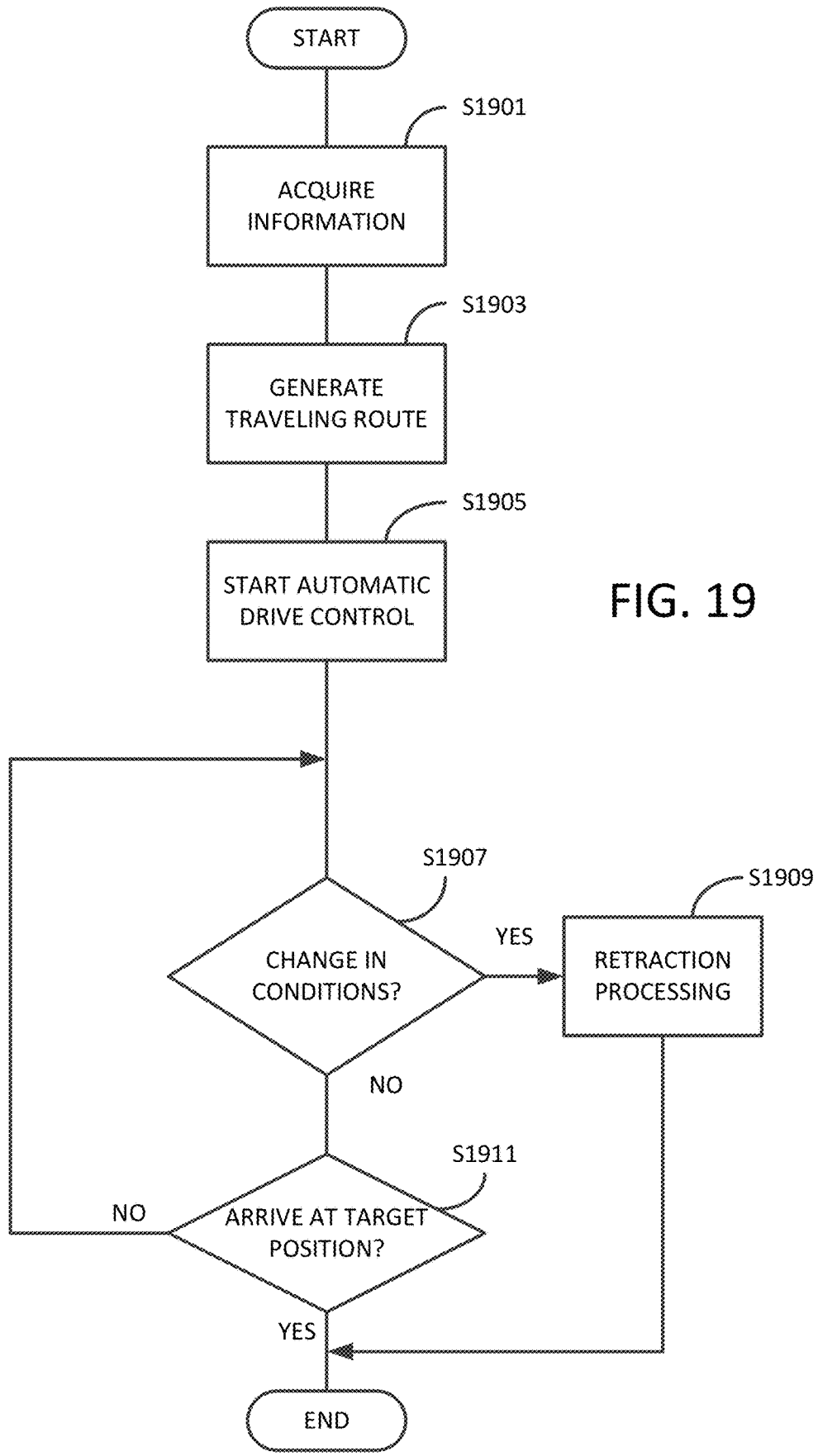
FIG. 19 is flowchart for a method of processing in the automatic parking system in accordance with an exemplary aspect of the disclosure.

Next, the operation of the automatic parking system 1600 in the present embodiment will be described. FIG. 19 is a flowchart illustrating the processing in the automatic parking system 1600 in accordance with an exemplary aspect of the disclosure. FIG. 19 illustrates the processing task performed when the vehicle 100 travels in the parking lot 40 using the automatic drive control (automatic parking control). For example, the processing starts when the operation by the occupant to start the automatic drive control is input by the occupant via the input unit 1616 or the mobile device.

As illustrated in S1901 in FIG. 19, the information acquisition unit 1631 acquires the information necessary for the automatic drive control. The information acquisition unit 1631 acquires, for example, the map data of the parking lot 40 and the vacancy information of the parking space 41 from the parking lot management system 1606.

Next, the process proceeds to traveling route generation processing (S1903). First, the parking position determination unit 1632 determines the target position. In a case of entering or changing the parking position, the target position is determined based on the vacancy information of the parking space 41 obtained in the processing of S1901. In this case, the target parking space 41a becomes the target position. At the time leaving, for example, the exit 46 becomes the target position. Then, the traveling route generation unit 1633 generates the traveling route of the vehicle 100 from the current position to the target position using the map data of the parking lot 40.

Next, the automatic drive control is started (S1905). The automatic drive unit 1634 starts the vehicle control including the automatic drive control. The automatic drive unit 1634 performs the automatic drive control of the vehicle 100 in the parking lot 40 to move from the current position to the target position in the parking lot 40 determined in the processing of S1903, based on the monitoring result of the monitoring device 1661. The automatic drive unit 1634 performs the automatic drive control by outputting the control signal to the drive ECU 1645, the braking ECU 1646, and the steering ECU 1644. Furthermore, the automatic drive unit 1634 outputs the control signal to the door lock control unit 1643 before or at the same time as when the automatic drive control is started, and controls the door lock 1643 to be in the locked state.

Next, it is determined whether a change in conditions or not (S1907). In the processing of S1907, the automatic drive unit 1634 determines whether or not the dynamic condition determination is performed by the dynamic condition determination unit 1635. The dynamic condition determination unit 1635 repeatedly determines whether or not the dynamic condition determination between the vehicle 100 in the automatic drive control and the obstacle is performed. In a case where the dynamic condition determination is performed by the dynamic condition determination unit 1635, the process proceeds to the removal processing (S1909). In a case where the removal processing, the control processing illustrated in FIG. 19 ends.

On the other hand, in a case where the dynamic condition determination is not performed by the dynamic condition determination unit 1635, the process proceeds to arrival determination processing (S1911). In the processing of S1911, the automatic drive unit 1634 determines whether or not the vehicle 100 has arrived at the target position based on the monitoring result of the monitoring device 1661 or the detection result of the vehicle mounted sensor 1601 in the vehicle 100. In a case where it is determined using the automatic drive unit 1634 that the vehicle 100 has not arrived at the target position, the process proceeds to the processing of S1907 once again. In this way, during the automatic drive control (automatic parking control), the determination in S1907 is repeatedly executed, and when the vehicle 100 arrives at the target position, the automatic drive control ends and the control processing illustrated in FIG. 19 ends.

Once the autonomous vehicle is moved, the mobile application 413 may reassess the status of perishable items and present a display such as that shown in FIG. 9.

Numerous modifications and variations of the present invention are possible in light of the above teachings. It is therefore to be understood that within the scope of the appended claims, the invention may be practiced otherwise than as specifically described herein.

The invention claimed is:

1. A system of temperature optimization in a passenger vehicle when transporting perishable items, comprising:
   the passenger vehicle having a passenger cabin including predetermined storage compartments for storing perishable items;
   an in-vehicle computer network connected to a plurality of sensors, including at least one sensor for monitoring an external environment of the vehicle; and
   a display device in communication with the in-vehicle computer network;
   wherein the display device obtains information about the perishable items,
   wherein the display device is configured to estimate time that the perishable items may be maintained in the storage compartments based on the monitored external environment, and
   wherein the display device is configured to update the user on the status of the perishable items.

2. The system of claim 1, wherein the display device is configured to display the perishable items in an order of perishability based on the information about the perishable items.

3. The system of claim 1, wherein the display device is configured to graphically display the predetermined storage compartments within the vehicle.

4. The system of claim 1, wherein the display device is configured to display a list of the perishable items with the corresponding compartments within the vehicle that the perishable items are stored.

5. The system of claim 1, wherein the display device is configured to display the updated status information of the perishable items as a list of the perishable items and corresponding remaining storage time.

6. The system of claim 3, wherein the display device is configured to display a pop-up list of perishable items upon selection of a storage compartment within the vehicle.

7. A system of temperature optimization in a passenger vehicle when transporting perishable items, comprising:
- the passenger vehicle having predetermined storage compartments;
- an in-vehicle computer network connected to a plurality of sensors; and
- a display device in communication with the in-vehicle computer network;
- wherein the display device obtains information about perishable items,
- wherein the display device is configured to estimate time that the perishable items may be maintained in the vehicle,
- wherein the display device is configured to update the user on the status of the perishable items, and
- wherein the display device is further configured to recommend compartments within the vehicle for storage of certain perishable items and estimate time that the perishable items may be maintained in recommended compartments.

8. A system of temperature optimization in a passenger vehicle when transporting perishable items, comprising:
- the passenger vehicle having predetermined storage compartments;
- an in-vehicle computer network connected to a plurality of sensors; and
- a display device in communication with the in-vehicle computer network;
- wherein the display device obtains information about perishable items,
- wherein the display device is configured to estimate time that the perishable items may be maintained in the vehicle,
- wherein the display device is configured to update the user on the status of the perishable items, and
- wherein the display device is further configured to recommend compartments within the vehicle for storage of certain perishable items and update time that the perishable items may be maintained in recommended compartments.

9. The system of claim 1, wherein the display device is further configured to display a request to start the vehicle in order to extend time to keep the perishable items fresh, and
- wherein the display device is configured to transmit a command to the in-vehicle computer network to start the vehicle in response to the request.

10. The system of claim 1, wherein the display device obtains information about perishable items from a cloud service database.

11. The system of claim 1, wherein the sensor data includes image data of at least one other vehicle that provides shade to the vehicle, and
- wherein the in-vehicle computer network estimates when the other vehicle will move.

12. The system of claim 1, wherein the display device is configured to monitor, when the vehicle deviates from a route and parks in a location, the status of an external environment of the vehicle as it relates to the perishable items,
- wherein the display device is configured to determine that the change in status of the external environment causes the temperature of at least one compartment in the vehicle interior to change to a critical temperature.

13. The system of claim 1, wherein the passenger vehicle is a self-driving vehicle,
- wherein the display device is configured to monitor, when the vehicle deviates from a route and parks in a location, the status of an external environment of the vehicle as it relates to the perishable items, and
- when the display device determines that the external environment changes in status, the display device is configured to transmit a command to the in-vehicle computer network to cause the self-driving vehicle to move to a new location.

* * * * *